(12) United States Patent
Tani et al.

(10) Patent No.: US 6,902,845 B2
(45) Date of Patent: Jun. 7, 2005

(54) ALKALINE RECHARGEABLE BATTERY AND PROCESS FOR THE PRODUCTION THEREOF

(75) Inventors: Atsushi Tani, Nara (JP); Soichiro Kawakami, Nara (JP)

(73) Assignee: Canon Kabushiki Kaisha, Tokyo (JP)

( * ) Notice: Subject to any disclaimer, the term of this patent is extended or adjusted under 35 U.S.C. 154(b) by 444 days.

(21) Appl. No.: 10/093,657

(22) Filed: Mar. 8, 2002

(65) Prior Publication Data

US 2002/0197530 A1 Dec. 26, 2002

(30) Foreign Application Priority Data

Mar. 9, 2001 (JP) .......................................... 2001-067325
Mar. 4, 2002 (JP) .......................................... 2002-057267

(51) Int. Cl.$^7$ ................................................ H01M 4/58
(52) U.S. Cl. ............................... 429/218.2; 429/218.1; 429/231.6; 429/231.8
(58) Field of Search .......................... 429/218.1, 218.2, 429/231.6, 231.8

(56) References Cited

U.S. PATENT DOCUMENTS

| | | | |
|---|---|---|---|
| 5,527,638 A | * | 6/1996 | Kinoshita et al. ............ 429/101 |
| 5,775,602 A | * | 7/1998 | Furukawa ..................... 241/16 |
| 6,040,087 A | | 3/2000 | Kawakami ................. 429/218.1 |
| 6,051,340 A | | 4/2000 | Kawakami et al. ..... 429/231.95 |
| 6,165,642 A | | 12/2000 | Kawakami et al. ....... 429/218.1 |
| 6,171,727 B1 | | 1/2001 | Ogura et al. .............. 429/218.2 |

FOREIGN PATENT DOCUMENTS

| | | | |
|---|---|---|---|
| JP | 7-37582 | 2/1995 | |
| JP | 8-69795 | 3/1996 | |
| JP | 9-31575 | * 2/1997 | ........... C22C/19/03 |
| JP | 9-312157 | 2/1997 | |

OTHER PUBLICATIONS

*Industrial Research Institute Journal* No. 391, p. 32 Osaka Industrial Research Institute of Agency of Industrial Science and Technology (1997).

*Grinding*, No. 41, pp. 42–43, Fine Particle Engineering Research Institute of Hosokawa Micron Kabushiki Kaisha.

* cited by examiner

*Primary Examiner*—Dah-Wei Yuan
(74) *Attorney, Agent, or Firm*—Fitzpatrick, Cella, Harper & Scinto

(57) ABSTRACT

A rechargeable battery having an anode comprising a powdery composite material said powdery composite material comprising a plurality of powdery composites having a structure comprising a core whose surface is covered by a coat layer, said core comprising an alloy particle of an alloy capable of reversibly storing and releasing hydrogen as a main component, said alloy containing at least one kind of a metal element selected from the group consisting of Zr, Ti and V as a main constituent element, and said coat layer comprising a hydrous oxide (including a hydroxide) of a metal element having an affinity with oxygen which is greater than that of any of said metal elements as the main constituent element of said alloy.

64 Claims, 9 Drawing Sheets

F I G. 4
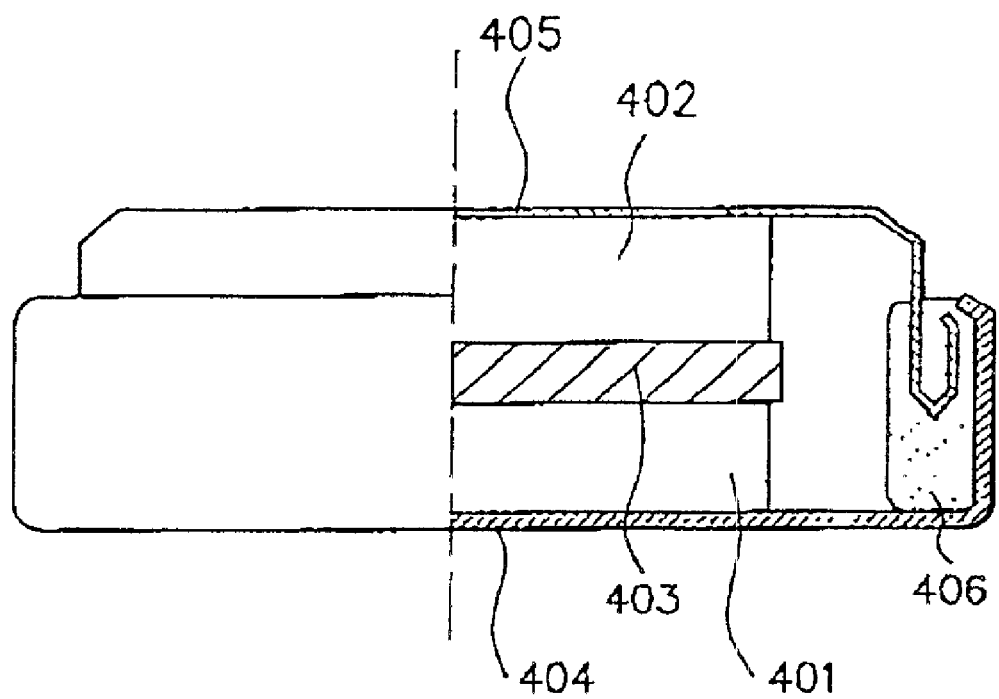

F I G. 6
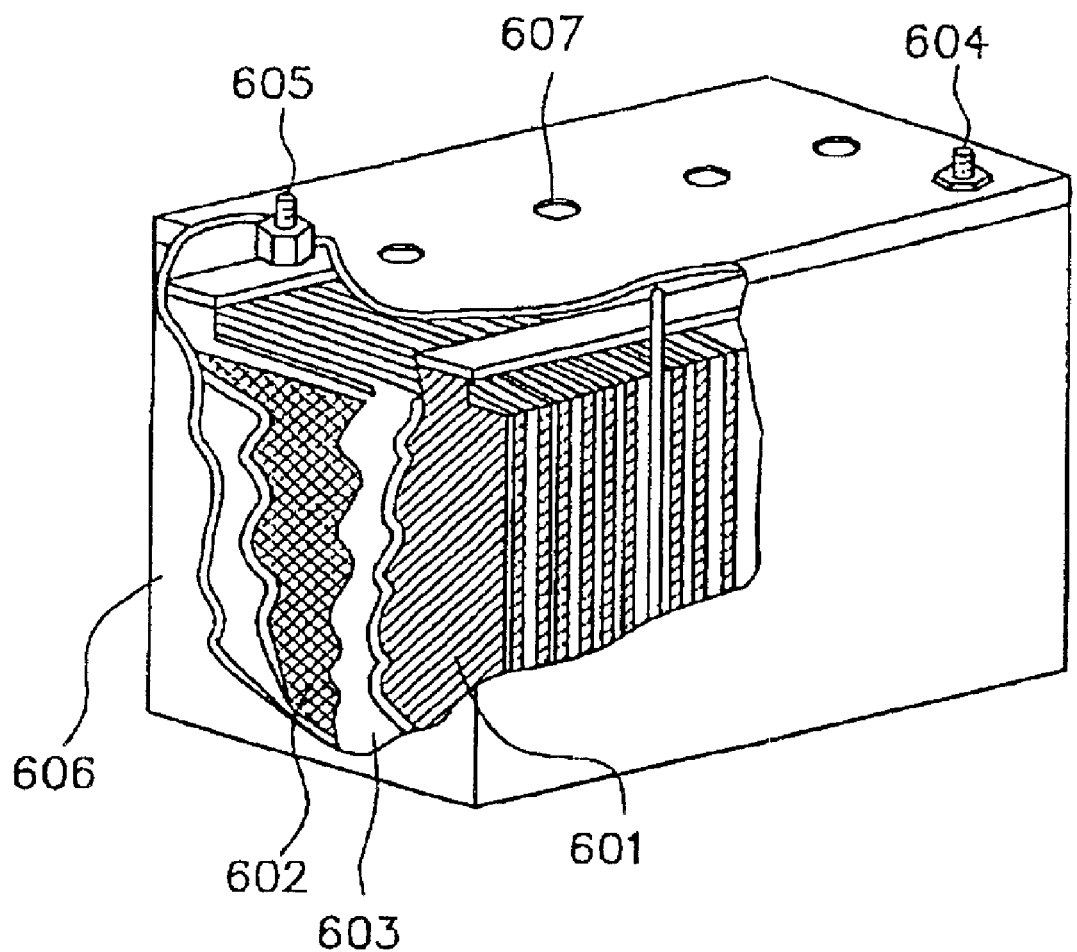

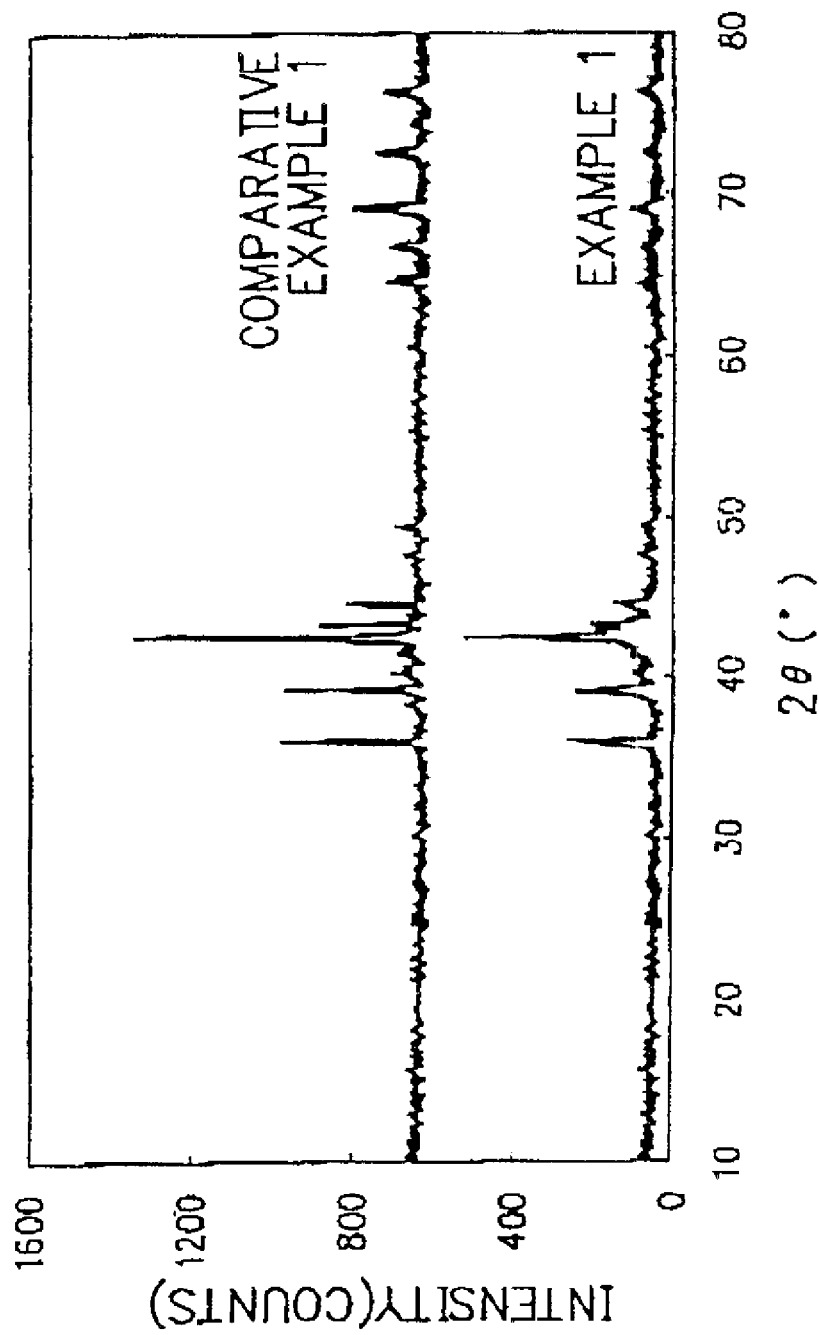

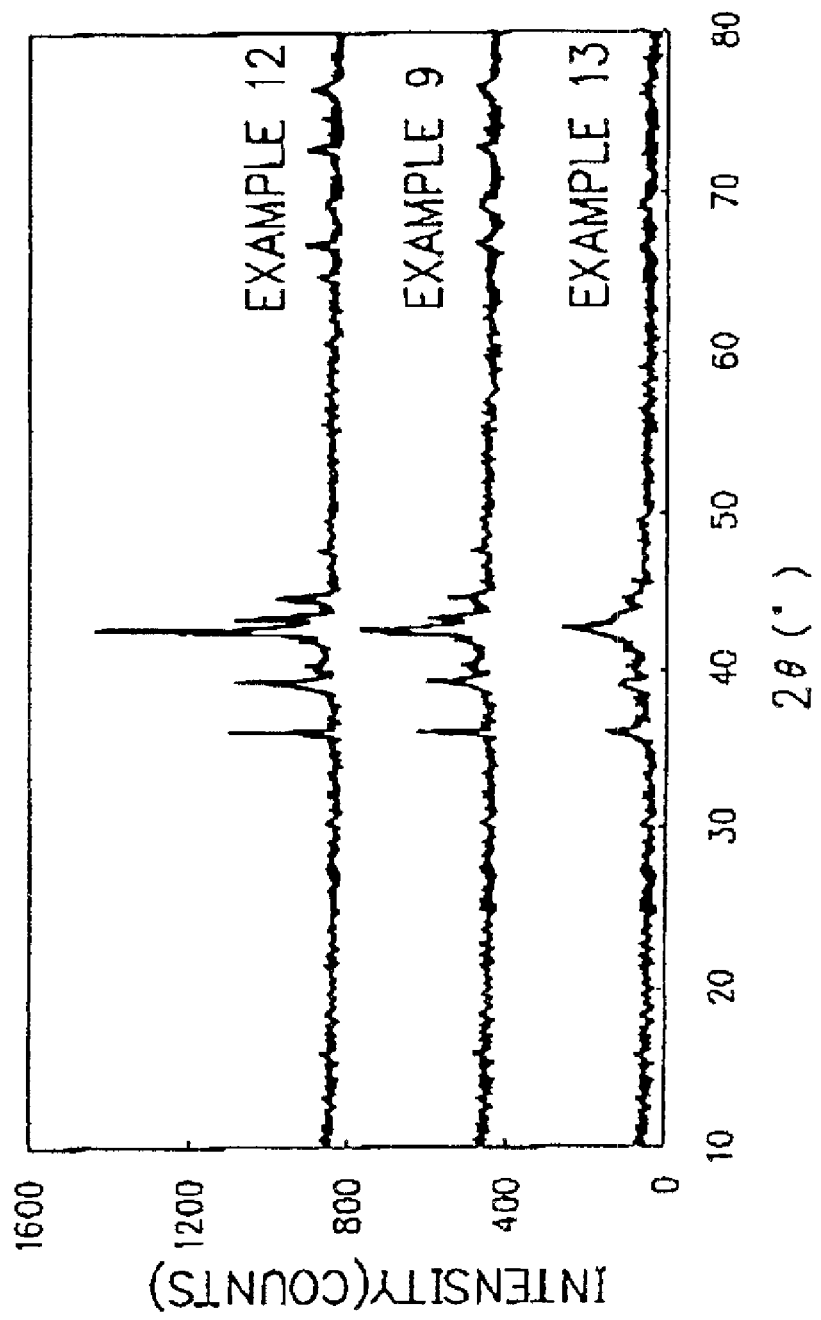

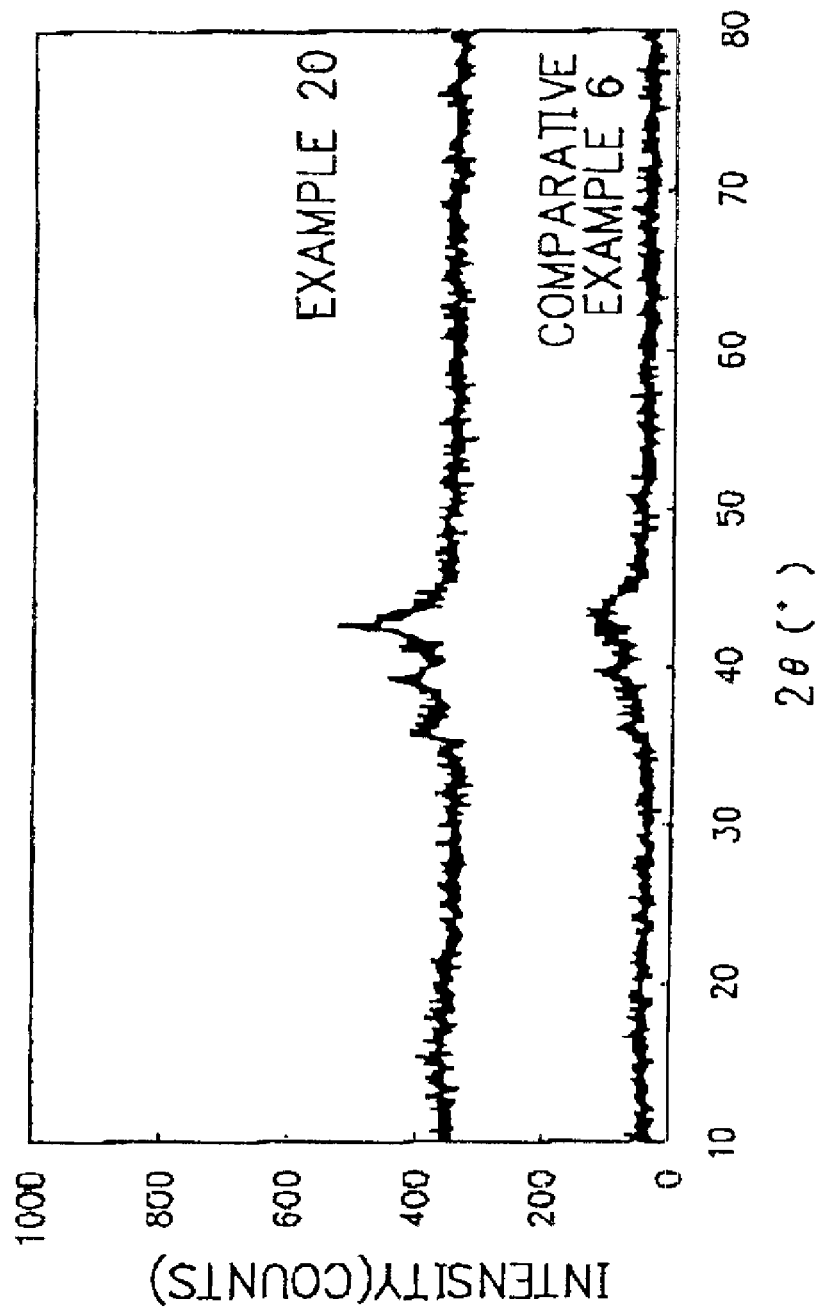

ALKALINE RECHARGEABLE BATTERY AND PROCESS FOR THE PRODUCTION THEREOF

BACKGROUND OF THE INVENTION

1. Field of the Invention

The present invention relates to an alkaline rechargeable battery whose anode comprises a particulate (or a powder) of an alloy capable of reversibly storing and releasing hydrogen as a main component and a process for the production of said rechargeable battery. More particularly, the present invention relates to an alkaline rechargeable battery having an anode formed using an alloy particulate capable of reversibly storing and releasing hydrogen as a main component, said anode having an excellent electrode activity and a high active-material utilization efficiency, excelling in resistance to overcharge and having a prolonged life time, and said rechargeable battery having excellent charge-and-discharge characteristics, excelling in resistance to overcharge, having a prolonged cycle life, and being capable of being provided at a reasonable cost. The present invention includes a process for the production of said rechargeable battery.

The term "particulate" in the present invention includes a powder and comprises separate particles having a given average particle size.

2. Related Background Art

In recent years, the global warming of the earth because of the so-called greenhouse effect due to an increase in the content of $CO_2$ gas in the air has been predicted. For instance, in thermal electric power plants, thermal energy obtained by burning a fossil fuel is being converted into electric energy, and along with burning of such fossil fuel, a large amount of $CO_2$ gas is being exhausted in the air. Accordingly, in order to suppress this situation, there is a tendency of prohibiting the new establishment of thermal electric power plants. Under these circumstances, so-called load leveling practice has been proposed in order to effectively utilize electric powers generated by power generators in thermal electric power plants or the like, wherein a surplus power unused in the night is stored in rechargeable batteries installed at general houses and the power thus stored is used in the daytime when the demand for power is increased, whereby the power consumption is leveled.

Separately, in recent years, gasoline-fueled vehicles also have been becoming an issue because they exhaust air polluting substances such as $CO_2$, $NO_x$, hydrocarbons and the like. On the other hand, electric vehicles which are driven by virtue of electricity stored in the rechargeable batteries provided therein without exhausting such air polluting substances have attracted the public attention, and research and development have been vigorously conducted in order to put such electric vehicles to practical use. Along with this, there is an increased demand for developing a high performance rechargeable battery having a high energy density and a prolonged cycle life and which can be provided at a reasonable cost.

Besides, there is also an increased demand for developing a miniature, lightweight, high performance rechargeable battery usable as a power source for portable instruments such as small personal computers, word processors, video cameras, and cellular phones.

In order to comply with these demands, research and development have been vigorously conducted on nickel-metal hydride rechargeable batteries in which a cathode comprising a nickel hydroxide as a cathode active material and an anode comprising an alloy capable of reversibly storing and releasing hydrogen (this alloy will be hereinafter referred to as "hydrogen storage alloy") as an anode active material are used. And some of these nickel-metal hydride rechargeable batteries have been put to practical use.

Incidentally, metals can be roughly categorized into two groups, i.e., a group of exothermic type metals which can exothermicaly react with hydrogen to produce a stable hydride and a group of endothermic type metals which can endothermicaly react with hydrogen but do not have a chemical affinity with hydrogen under normal condition. As typical specific examples of the exothermic type metal, there can be mentioned alkali metals, alkaline earth metals, rare earth metals, and transition metals belonging to groups 4 and 5 of the periodic table in accordance with the classification method of IUPAC (International Union of Pure and Applied Chemistry) enacted in 1990. As typical specific examples of the endothermic type metal, there can be mentioned transition metals belonging to groups 6 to 9 and also to group 10 (excluding Pd) of aforesaid periodic table.

Now, there are known various hydrogen storage alloys capable of reversibly storing and releasing hydrogen, comprising a combination of a given exothermic type metal and a given endothermic type metal. The exothermic metal in the hydrogen storage alloy functions to strongly bond with hydrogen, and the endothermic metal, specifically Fe, Co, or Ni in the hydrogen storage alloy functions as a catalyst to dissociate molecular hydrogen deposited thereon into hydrogen atoms. Thus, upon the preparation of such hydrogen storage alloy, by adjusting the kinds of metal elements to constitute the alloy and controlling the composition ratios of the metal elements, it is possible to obtain a desired hydrogen storage alloy having an equilibrium hydrogen pressure which matches with given use purposes.

The hydrogen storage alloys which presently have been used in the anodes of the rechargeable batteries are mostly Mischmetal series alloys (comprising a mixture of rare earth metals) represented by $Mm(Ni—Co—Mn—Al)_5$ alloys (with Mm being Mischmetal). Besides, there have been proposed Laves phase alloys such as Zr—Ti—Ni—Mn—V—Cr—Co alloy and the like, and some of them have been put to practical use as an anode material of a rechargeable battery. Separately, studies have been made of magnesium-nickel series alloys such as $Mg_2Ni$ alloy, Mg—Ni alloy and the like and also of bcc (body-centered cubic structure) type solid solution alloys such as Ti—V—Ni alloy and the like with respect to the possibility of their use as an anode material of a rechargeable battery.

Incidentally, in comparison with the Mischmetal series alloy, the Laves phase alloy is capable of storing hydrogen in a larger amount and is relatively stable to an alkali electrolyte solution. Therefore, the Laves phase alloy has been considered to be promising to use as an anode material of a rechargeable battery. However, the Laves phase alloy has drawbacks such that Zr, Ti and V which are the principal elements to constitute the Laves phase alloy and which are belonging to the foregoing exothermic metals are more likely to react with oxygen in the air to form a solid oxide and because of this, a particulate of such alloy is covered by a surface layer comprising such solid oxide in general. Thus, a rechargeable battery having an anode formed using such Laves phase alloy is extremely inferior in terms of the reaction activity at the initial stage of the charge-and-discharge cycle. In order to eliminate this problem, it is necessitated that the discharge capacity of the rechargeable battery is increased to a prescribed value by way of an initial activation treatment. The initial activation treatment includes a treatment wherein the rechargeable battery is subjected to a heat treatment prior to performing the initial charging for the rechargeable battery and a treatment wherein the rechargeable battery is subjected to a treatment of repeating a cycle of charging and discharging about 10 times.

This situation of the Laves phase alloy is similar also in the case of the body-centered cubic structure type solid solution alloy. Particularly, the body-centered cubic structure type solid solution alloy has a function to store hydrogen in a large amount as well as the Laves phase alloy. Thus, the body-centered cubic structure type solid solution alloy has been expected to be usable as a high capacity anode material in a rechargeable battery. However, the body-centered cubic structure type solid solution alloy has drawbacks such that Ti and V which are the principal elements to constitute the body-centered cubic structure type solid solution alloy are more likely to react with oxygen in the air to form a solid oxide and because of this, a particulate of such alloy is covered by a surface layer comprising such solid oxide in general, as well as in the case of the Laves phase alloy. Thus, for a rechargeable battery having an anode formed using such body-centered cubic structure type solid solution alloy, it is also necessitated that the rechargeable battery is subjected to such initial activation treatment as above described, in order to improve the performance.

About one week is generally required to complete the foregoing initial activation treatment in order to improve the performance of such rechargeable battery as above described. This raises the production cost of the rechargeable battery. This situation interrupts to put the abovementioned hydrogen storage alloys to practical use as an anode material of a rechargeable battery, although these hydrogen storage alloys have a pronounced advantage in that they are capable of providing an electrode (an anode) having a high capacity usable in a rechargeable battery.

Incidentally, in a sealed type rechargeable battery having an anode comprising a hydrogen storage alloy and which is housed in a battery housing having a safety vent, there is generally adopted a system in that the capacity of the anode is made to be greater than that of the cathode so that oxygen gas generated from the cathode at last stage of charging is absorbed by the anode to reduce into water. For the sealed type rechargeable battery, there is a disadvantage such that when the hydrogen storage alloy constituting the anode is inferior in terms of the initial activity, hydrogen gas is liable to generate from the anode at the initial state of the charge-and-discharge cycle, and when said hydrogen gas is generated, the inner pressure of the rechargeable battery is increased to open the safety vent of the battery housing, where there is an occasion in that the electrolyte solution in the rechargeable battery is flied off to shorten the lifetime of the rechargeable battery. There is also a disadvantage such that it is difficult to form a proper discharge reserve (a surplus capacity in a discharged state provided utilizing an irreversibly reacting component of the cathode at an initial stage of performing charging in order to prevent the anode from being polarized) in the anode and because of this, when the rechargeable battery is discharged at a high rate, the capacity of the anode is liable to greatly decrease.

In order to prevent these problems from occurring, it is necessary to enlarge the ratio between the capacity of the anode and that of the cathode. However, when the ratio between the capacity of the anode and that of the cathode is enlarged, there will be a disadvantage such that the energy density of the rechargeable battery is diminished.

In order to eliminate such problems as above described, there has been proposed a method of treating a powdery hydrogen storage alloy in an intense alkali solution maintained at elevated temperature prior to using it in the formation of an anode of a rechargeable battery. For instance, in Industrial Research Institute Journal No. 391, page 32, published in 1997 by Osaka Industrial Research Institute of Agency of Industrial Science and Technology (hereinafter referred to as Document 1), there is described a method wherein a powdery Zr series C15 type Laves phase alloy as a hydrogen storage alloy is treated by boiling it in a potassium hydroxide aqueous solution of 6M. In Document 1, there is also described that according to this method, oxide coats of Ti and Zr on the surface of the powdery alloy are dissolved and removed while Mn and V as soluble materials contained in the powdery alloy are dissolved and removed, where a coat with a high Ni-content is formed on the surface of the powdery alloy, and when the powdery alloy thus treated is used in the formation of an anode for a rechargeable battery, the anode excels in the initial activity. However, the method disclosed in Document 1 has such disadvantages as will be described in the following. A complicated process including a washing step with water and a drying step is required to be performed after the treatment by the potassium hydroxide aqueous solution in order to obtain a desirable powdery hydrogen storage alloy. This serves to raise the production cost of the product. In addition, the surface of the powdery alloy obtained in accordance with the method disclosed in Document 1 is liable to oxidize and therefore, when the powdery alloy is allowed to stand in the atmospheric air over a long period of time, the surface of the powdery alloy is deactivated. Thus, it is necessitated that immediately after the treatment by the potassium hydroxide aqueous solution, the powdery alloy is subjected to the formation of the anode.

Separately, there has been proposed a method wherein a powdery hydrogen storage alloy is mixed with a powdery nickel to obtain a mixture and the mixture is subjected to a treatment with the application of mechanical energy, whereby a hydrogen storage alloy particulate deposited with a nickel particulate on the surface is obtained. For instance, in GRINDING No. 41, p.p. 42–43, published in 1997 by Fine Particle Engineering Research Institute of Hosokawa Micron Kabushiki Kaisha (hereinafter referred to as Document 2), there is described a method wherein nickel fine powder is deposited on the surface of a powdery hydrogen storage alloy of $ZrMn_{0.6}V_{0.2}Cr_{0.2}Ni_{1.2}$ by way of a mechano-fusion treatment. Document 2 also describes that according to this method, a Ni-diffused layer is formed on the alloy surface to provide an increase in the specific surface and an improvement in the electrode activity and the initial activity of the electrode and the high rate discharge characteristics are improved. Thus, when the method described in Document 2 is adopted in the formation of an anode for a rechargeable battery, having an active material layer comprising such powdery hydrogen storage alloy on a collector, it is considered that there would be provided an effect in that the conductivity between particles of the powdery alloy and that between the powdery alloy and the collector and an effect in that the powdery alloy functions as a catalyst in the battery reaction. However, in the experimental studies by the present inventors, no distinguished effect has been recognized with respect to the function as the catalyst, and the number of the charge-and-discharge cycles required for the initial activation treatment of the rechargeable battery has slightly diminished. For the reason for this, it is considered such that the nickel fine particles deposited on the powdery alloy surface are present through a solid oxide coat of Zr or the like previously formed on the powdery alloy surface, the powdery alloy does not effectively function as the catalyst.

There has been proposed a method of removing an oxide coat formed on the surface of a powdery hydrogen storage alloy while nickel particles are deposited on the powdery alloy surface. For instance, Japanese Laid-open Patent Application No. 9(1997)-312157 (hereinafter referred to as Document 3) discloses a method wherein a powdery hydrogen storage alloy is subjected to a reduction treatment with the use of hydrogen gas or it is subjected to an etching treatment with the use of an aqueous solution of hydrofluoric acid to remove an oxide coat formed on the surface of the powdery hydrogen storage alloy and nickel fine particles are deposited on the surface of the treated powdery hydrogen storage alloy by way of a ball mill treatment or a mechanofusion treatment. However, the method disclosed in Document 3 has such disadvantages as will be described in the following. The oxide coat formed on the powdery hydrogen storage alloy cannot be sufficiently removed by the reduction treatment using the hydrogen gas. According to the etching treatment using the hydrofluoric acid aqueous solution, although the oxide coat can be removed, the necessary elements of the powdery hydrogen storage alloy are dissolved and removed upon the etching treatment. And in the case where the etching treatment using the hydrofluoric acid aqueous solution is adopted, a complicated process including a washing step with water and a drying step is required to be performed after the etching treatment in order to obtain a desirable powdery hydrogen storage alloy. This serves to raise the production cost of the product. In addition, the surface of the powdery hydrogen storage alloy obtained is liable to oxidize and therefore, when the powdery hydrogen storage alloy is allowed to stand in the atmospheric air over a long period of time, the surface of the powdery hydrogen storage alloy is deactivated.

Japanese Laid-open Patent Application No. 7(1995)-37582 (hereinafter referred to as Document 4) discloses a method wherein a mixed powder of a powdery hydrogen storage alloy of $ZrMn_{0.6}V_{0.2}Cr_{0.1}Ni_{1.2}$, a powdery nickel hydroxide is admixed with a powdery calcium as a reducing agent in an amount exceeding the amount of the powdery nickel hydroxide, the resultant is stirred, followed by subjecting to a washing treatment with water, to obtain a mixture comprising a black nickel powder and the powdery hydrogen storage alloy. However, in the mixture obtained in accordance with the method disclosed in Document 4, the nickel powder is present merely in a mixed state and therefore, it does not have a remarkable hydrogen activity. And in the method disclosed in Document 4, the calcium and calcium hydroxide in the mixture are removed by the water-washing treatment. This makes the process complicated to raise the production cost of the product.

Japanese Laid-open Patent Application No. 8(1996)-69795 (hereinafter referred to as Document 5) discloses a method for the production of a hydrogen storage alloy electrode having an improved initial activity and which is usable as the anode of a rechargeable battery. Specifically, Document 5 discloses a method wherein a mixed powder of a powdery hydrogen storage alloy of $Zn(V_{0.1}Ni_{0.64}Mn_{0.38})_{2.1}$ and a powdery magnesium as a reducing agent is subjected to a rolling treatment together with a porous body formed of an alkali-corrosive resistant metal to form an electrode form and the electrode form is subjected to a heat treatment at a temperature of 700 to 1000° C., which is higher than the melting point of the reducing agent, in an inert gas atmosphere, whereby a hydrogen storage alloy electrode having an improved initial activity is obtained. Document 5 describes that according to this method, an oxide layer formed on the surface of the powdery hydrogen storage alloy is reduced into a metal. However, in the method disclosed in Document 5, the magnesium as the reducing agent and the hydrogen storage alloy are reacted at such high temperature as above described, where the elements constituting the hydrogen storage alloy are partly alloyed with the magnesium to cause a change in the composition of a surface region of the hydrogen storage alloy. Therefore, although the initial activity of the hydrogen storage alloy electrode is improved, the maximum discharge capacity of a rechargeable battery in which the hydrogen storage alloy electrode is used as the anode is reduced in practice.

U.S. Pat. No. 6,040,087 hereinafter referred to as Document 6) discloses a powdery material usable as the anode of a rechargeable battery, comprising a core comprising a powdery hydrogen storage alloy, a layer formed to cover the surface of the core, comprising a transition metal oxide layer or a transition metal oxide layer incorporated with aluminum or silicon; and a metal element having a function to make hydrogen to be in an active state, dispersed on the surface of said layer. Document 6 describes that the powdery material has an improved discharge capacity and excellent overcharge-resistant characteristics. However, for a rechargeable battery in which the powdery material is used as the anode, there is still a subject to be improved with respect to shortening the time required for the initial activation treatment.

SUMMARY OF THE INVENTION

The present invention has been accomplished in view of the foregoing situation in the prior art for the rechargeable batteries having an anode comprising a hydrogen storage alloy.

An object of the present invention is to provide an alkaline rechargeable battery having an anode formed using a powdery material of an alloy capable of reversibly storing and releasing hydrogen as a main component, said anode having an excellent electrode activity and a high active-material utilization efficiency, excelling in resistance to overcharge and having a prolonged life time, and said rechargeable battery having excellent charge-and-discharge characteristics, excelling in resistance to overcharge, having a prolonged cycle life, and being capable of being provided at a reasonable cost.

A typical embodiment of said alkaline rechargeable battery provided according to the present invention is an alkaline rechargeable battery comprising an anode, a cathode, a separator and an alkali electrolyte solution, characterized in that said anode has an active material layer formed of a powdery composite material comprising a plurality of powdery composites having a structure comprising a core whose surface is covered by a coat layer, said core comprising an alloy particle of (a) an alloy capable of reversibly storing and releasing hydrogen as a main component, said alloy (a) containing at least one kind of (a-i) a metal element selected from the group consisting of Zr, Ti and V as a main constituent element, and said coat layer comprising a hydrous oxide (including a hydroxide) of (b) a metal element having an affinity with oxygen which is greater than that of any of said metal elements (a-i) as the main constituent element of said alloy (a).

Said coat layer is preferred to have particles of a metal or a metal compound having a catalyst function to make hydrogen to be in an active state such that said particles are dispersed in the inside or/and in the surface region of said coat layer.

Another object of the present invention is to provide a process for the production of an alkaline rechargeable battery comprising an anode, a cathode, a separator and an alkali electrolyte solution, said process is characterized by including a step of forming said anode, comprising a first step of providing an alloy powder of (a) an alloy capable of reversibly storing and releasing hydrogen and which contains at least one kind of (a-i) a metal element selected from the group consisting of Zr, Ti and V as a main constituent element, a second step of forming, on the surface of said alloy powder, a coat layer comprising a hydrous oxide (including a hydroxide) of (b) a metal element having an affinity with oxygen which is greater than that of any of said metal elements (a-i) as the main constituent element of said alloy (a), to obtain a powdery composite material comprising a plurality of powdery composites having a structure comprising a core comprising an alloy particle of said alloy (a) and whose surface is covered by said coat layer, and a third step of forming said anode using said powdery composite material.

The second step is preferred to include an additional step of dispersing particles of a metal or a metal compound having a catalyst function to make hydrogen to be in an active state such that said particles are dispersed in the inside or/and in the surface region of said coat layer.

BRIEF DESCRIPTION OF THE DRAWINGS

FIG. 4 is a schematic cross-sectional view illustrating an example of a single-layer structure type flat rechargeable battery according to the present invention.

FIG. 6 is a schematic perspective view illustrating an example of a prismatic rechargeable battery according to the present invention.

FIG. 7 collectively shows an X-ray diffraction chart of an alloy particulate (powder) used as a core material of an anode material obtained in Example 1 which will be described later and an X-ray diffraction chart of an alloy particulate (powder) used as an anode material obtained in Comparative Example 1 which will be described later.

FIG. 8 collectively shows an X-ray diffraction chart of an alloy particulate (powder) used as a core material of an anode material obtained in Example 9 which will be described later, an X-ray diffraction chart of an alloy particulate (powder) used as a core material of an anode material obtained in Example 12 which will be described later, and an X-ray diffraction chart of an alloy particulate (powder) used as a core material of an anode material obtained in Example 13 which will be described later.

FIG. 9 collectively shows an X-ray diffraction chart of an alloy particulate (powder) used as a core material of an anode material obtained in Example 20 which will be described later and an X-ray diffraction chart of an alloy particulate (powder) used as an anode material obtained in Comparative Example 6 which will be described later.

DESCRIPTION OF THE INVENTION AND PREFERRED EMBODIMENTS

Figure 1A:
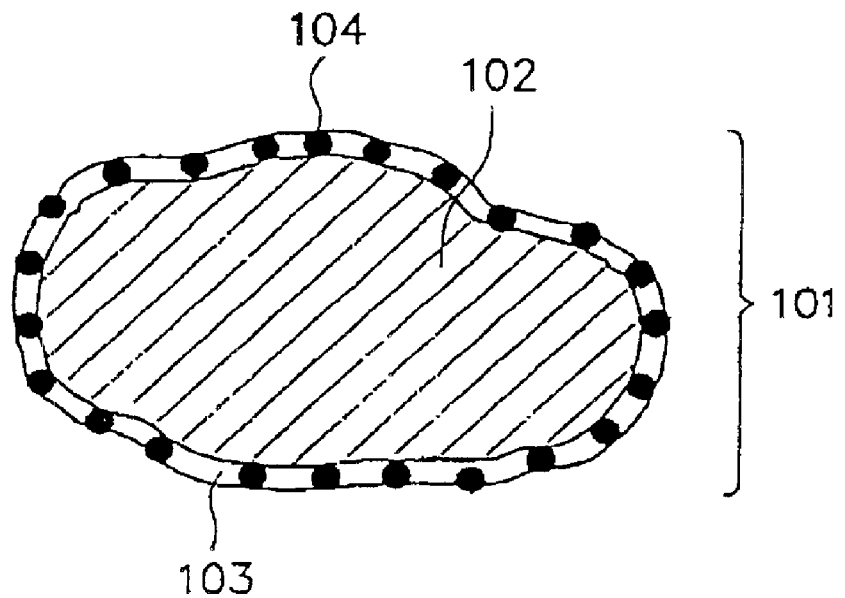
FIG. 1(a) is a schematic cross-sectional view illustrating an example of a composite used as an anode material of a rechargeable battery of the present invention.

As previously described, the present invention provides an alkaline rechargeable battery comprising an anode, a cathode, a separator and an alkali electrolyte solution, characterized in that said anode has an active material layer formed of a powdery composite material comprising a plurality of powdery composites having a structure comprising a core whose surface is covered by a coat layer, said core comprising an alloy particle of (a) an alloy capable of reversibly storing and releasing hydrogen as a main component, said alloy (a) containing at least one kind of (a-i) a metal element selected from the group consisting of Zr, Ti and V as a main constituent element, and said coat layer comprising a hydrous oxide (including a hydroxide) of (b) a metal element having an affinity with oxygen which is greater than that of any of said metal elements (a-i) as the main constituent element of said alloy.

Said coat layer comprising said hydrous oxide (including said hydroxide) is preferred to have particles of (c) a metal or (c') a metal compound having a catalyst function to make hydrogen to be in an active state such that said particles are dispersed in the inside or/and in the surface region of said coat layer.

The metal element (b) to constitute the hydrous oxide (including the hydroxide) of the coat layer is preferred to comprise at least one kind of a metal element selected from the group consisting of alkaline earth metals, and Al. As the alkaline earth metal, Mg and Ca are preferred. It is particularly preferred that the coat layer comprises a hydrous oxide (including a hydroxide) containing Al or Al and Mg. It is more preferred that the coat layer further contains Si or Li. In any case, the hydrous oxide (including the hydroxide) which constitutes the coat layer is preferred to contain amorphous phase.

The content of the hydrous oxide (including the hydroxide) as the coat layer in the powdery composite is desired to be preferably in a range of from 0.2 to 20 wt. % or more preferably in a range of from 0.5 to 10 wt. %, respectively versus the total weight of the powdery composite material.

The thickness of the coat layer is desired to be preferably in a range of from 5 nm to 1.0 $\mu$m or more preferably in a range of from 10 nm to 0.5 $\mu$m.

The metal (c) having a catalyst function to make hydrogen to be in an active state is preferred to comprise at least one kind of a metal selected from the group consisting of Ni, Pd, Pt, Co, Fe, Rh, Ru, Ir, Cr, Mo, W, Ta, and Cu. It is particularly preferred that the metal (c) comprises at least one kind of a metal selected from the group consisting of Ni, Pd, Pt, and Cu.

The metal compound (c') having a catalyst function to make hydrogen to be in an active state is preferred to comprise at least one kind of a metal compound selected from the group consisting of nickel oxide, chromium oxide, molybdenum oxide, copper oxide, zinc oxide, molybdenum carbide, and tungsten carbide.

The amount of the metal (c) or the metal compound (c') having a catalyst function to make hydrogen to be in an active state is preferred to be in a range of from 0.5 to 10 wt. % versus the total weight of the powdery composite material including said metal or said metal compound.

The coat layer comprising the hydrous oxide (including the hydroxide) is preferred to further have a carbon powder such that said carbon powder is dispersed in the inside or/and in the surface region of the coat layer.

As preferable specific examples of the alloy (a) capable of reversibly storing and releasing hydrogen, there can be mentioned Laves phase-bearing C14 ($MgZn_2$) type alloys, Laves phase-bearing C15 ($MgCu_2$) type alloys, and bcc (body-centered cubic structure)-bearing solid solution alloys.

These alloys as the alloy (a) capable of reversibly storing and releasing hydrogen are preferred to contain Ni and additionally one or more kinds of other metal elements selected from the group consisting of Co, Fe, Mn, Cr, Mo, W, Nb, Ta, Hf, Cu, and Zn, in the case where they do not contain these metal elements.

Any of the above-mentioned alloys as the alloy (a) capable of reversibly storing and releasing hydrogen may contain amorphous phase.

The alloy particle of the alloy (a) which constitutes the core is preferred to comprise a particle shaped in an indefinite form with an irregular surface and having an average particle size in a range of from 0.5 to 30 µm.

Incidentally, the cathode in the rechargeable battery of the present invention typically comprises a nickel hydroxide.

The present invention also provides a process for the production of an alkaline rechargeable battery comprising an anode, a cathode, a separator and an alkali electrolyte solution, said process is characterized by including a step of forming said anode, comprising a first step (1) of providing an alloy powder (a-i) of an alloy (a) capable of reversibly storing and releasing hydrogen and which contains at least one kind of a metal element (a-ii) selected from the group consisting of Zr, Ti and V as a main constituent element, a second step (2) of forming, on the surface of said alloy powder (a-i), a coat layer comprising a hydrous oxide (including a hydroxide) of (b) a metal element having an affinity with oxygen which is greater than that of any of said metal elements (a-ii) as the main constituent element of said alloy (a), to obtain a powdery composite material comprising a plurality of powdery composites having a structure comprising a core comprising an alloy particle of said alloy (a) and whose surface is covered by said coat layer, and a third step (3) of forming said anode using said powdery composite material.

The second step (2) is preferred to include an additional step of dispersing particles of a metal (c) or a metal compound (c') having a catalyst function to make hydrogen to be in an active state such that said particles are dispersed in the inside or/and in the surface region of said coat layer.

This additional step to disperse the particles of the metal (c) or the metal compound (c') in the inside or/and in the surface region of the coat layer may be performed at the same time of forming the coat layer, after the formation of the coat layer, or at the same of forming the coat layer and after the formation of the coat layer.

Specifically, the foregoing second step (2) may be performed in accordance with a method comprising a step (A) of coating the surface of the alloy powder (a-i) by a metal (b) having an affinity with oxygen which is greater than that of any of the metal elements (a-ii) as the main constituent element of the alloy (a) to obtain a powdery composite material, and a step (B) of reacting the powdery composite material comprising the alloy powder (a-i) coated by the metal (b) with water or an aqueous alkali solution to convert the metal (b) coated on the surface of the alloy powder (a-i) into a hydrous oxide (including a hydroxide) in a layer form.

In this case, the formation of the coat layer in the step (B) is preferred to be performed by a method of preparing an assembly comprising the anode comprising the powdery composite material obtained in the step (A), the separator and the cathode, inserting the assembly in a battery housing, and introducing an aqueous alkali electrolyte solution comprising an alkali electrolyte dissolved in water into the battery housing, whereby the metal (b) coated on the surface of the alloy powder is reacted with said aqueous alkali electrolyte solution to convert said metal (b) into a hydrous oxide (including a hydroxide) in a layer form as the coat layer.

The step (A) to coat the surface of the alloy powder (a-i) by the metal (b) may be performed by an adequate method. As preferable specific examples of such method, there can be mentioned the following two methods I and II.

Method I comprises a first step of mixing the alloy powder (a-i) and a powder of the metal (b) having an affinity with oxygen which is greater than that of any of the metal elements (a-ii) as the main constituent element of the alloy (a) to obtain a mixture and a second step of applying a mechanical energy to said mixture. The application of the mechanical energy to the mixture in the second step may be performed by means of a grinding apparatus such as tumbling ball mill, planetary ball mill, or vibration ball mill.

Method II comprises a first step wherein on the surface of the alloy powder (a-i), a particulate of the metal (b) having an affinity with oxygen which is greater than that of any of the metal elements (a-ii) as the main constituent element of the alloy (a) is deposited so as to cover the surface of the alloy powder to obtain a powdery composite material comprising the alloy powder (a-i) whose surface is deposited with said particulate of the metal (b), and a second step of subjecting said powdery composite material to a heat treatment at a temperature which is lower than a sintering temperature at which said powdery composite material is sintered or/and to an alkali treatment.

The deposition of the particulate of the metal (b) on the surface of the alloy powder may be performed by means of a vacuum deposition technique such as electron beam deposition, resistance heating deposition, sputtering, plasma CVD, or laser-assisted CVD.

The step of dispersing the particles of the metal (c) or the metal compound (c') having a catalyst function to make hydrogen to be in an active state in the inside or/and in the surface region of the coat layer may be performed at the same time of forming the coat layer, after the formation of the coat layer, or at the same time of forming the coat layer and after the formation of the coat layer as previously described.

This step may be performed by an adequate method. As specific examples of such method, there can be mentioned the following methods.

(1). In the foregoing method 1, upon mixing the alloy powder and the powder of the metal (b) in the first step, a powder of the metal (c) or the metal compound (c') having a catalyst function to make hydrogen to be in an active state is added to mix together with the alloy powder (a-i) and the powder of the metal (b) and the resultant mixture is subjected to the treatment in the second step, where the mechanical energy is applied to the mixture by means of the grinding apparatus such as tumbling ball mill, planetary ball mill, or vibration ball mill.

(2). On the surface of the powdery composite material comprising the alloy powder (a-i) whose surface is covered by the coat layer, a salt of the metal (c) having a catalyst function to make hydrogen to be in an active state is deposited such that the salt is dispersed on the surface of the powdery composite material and the salt deposited on the surface of the powdery composite material is reduced.

(3). The metal (c) or the metal compound (c') having a catalyst function to make hydrogen to be in an active state is deposited on the surface of the powdery composite material comprising the alloy powder (a-i) whose surface is covered by the coat layer such that the metal (c) or the metal compound (c') is dispersed on the surface of the powdery composite material, by means of electroless plating or electroplating.

(4). The metal (c) or the metal compound (c') having a catalyst function to make hydrogen to be in an active state is deposited on the surface of the powdery composite material comprising the alloy powder (a-i) whose surface is covered by the coat layer such that the metal (c) or the metal compound (c') is dispersed on the surface of the powdery composite material, by means of a vacuum deposition technique such as electron beam deposition, resistance heating deposition, sputtering, plasma CVD, or laser-assisted CVD.

The content of the hydrous oxide (including the hydroxide) as the coat layer in the powdery composite material is made to be preferably in a range of from 0.2 to 20 wt. % or more preferably in a range of from 0.5 to 10 wt. %, respectively versus the total weight of the powdery composite material.

The thickness of the coat layer is made to be preferably in a range of from 5 nm to 1.0 $\mu$m or more preferably in a range of from 10 nm to 0.5 $\mu$m.

The amount of the metal (c) or the metal compound (c') having a catalyst function to make hydrogen to be in an active state which is dispersed in the inside or/and in the surface region of the coat layer of the powdery composite material is made to be preferably in a range of from 0.5 to 10 wt. % versus the total weight of the powdery composite material including said metal or said metal compound.

Separately, it is preferred that a carbon powder is additionally dispersed in the inside or/and in the surface region of the coat layer of the powdery composite material.

The anode in the rechargeable battery of the present invention specifically comprises an active material layer comprising the foregoing powdery material (comprising a plurality of powdery composites having a structure comprising a core comprising an alloy particle of the alloy (a) and whose surface is covered by the coat layer) which is bonded on a collector selected from the group consisting of a punching metal, an expanded metal and a metal foil, respectively comprising a nickel or a nickel-plated metal.

To bond the active material layer to the collector may be performed, for example, by a method wherein the powdery material (comprising a plurality of powdery composites having a structure comprising a core comprising an alloy particle of the alloy (a) and whose surface is covered by the coat layer) is mixed with a solution containing a binder to obtain a paste and the paste is applied onto the collector or a method wherein the gaps between the composite particles of the powdery material and the gaps between the powdery material and the collector are bonded by way of sintering.

Incidentally, the present inventors conducted experimental studies of a rechargeable battery in which a powder of an alloy capable of reversibly storing and releasing hydrogen (this alloy will be hereinafter referred to as hydrogen storage alloy), specifically a powder of a hydrogen storage alloy containing at least one kind of a metal element selected from the group consisting of Zr, Ti and V as a main constituent element (this powder will be hereinafter referred to as hydrogen storage alloy powder) is used as the anode material. As a result, there were obtained the following findings. That is, when the surface of the hydrogen storage alloy powder is partially or entirely coated by a metal having an affinity with oxygen which is greater than that of any of the metal elements as the main constituent element of the alloy and the alloy powder coated by said metal is reacted with water or an aqueous alkali solution to convert the metal coated on the surface of the alloy powder into a hydrous oxide (including a hydroxide) to form a coat layer, and particles of a metal or a metal compound having a catalyst function to make hydrogen to be in an active state are dispersed such that said particles are dispersed in the inside or/and in the surface region of said coat layer, there are provided pronounced effects as will be described below.

While the high capacity, which is the inherent advantage of the hydrogen storage alloy, is maintained, the period of time required for the initial activation of the rechargeable battery is extremely shortened and the durability of the anode to overcharge is remarkably improved. In addition, the charge-and-discharge cycle life of the rechargeable battery is remarkably improved. The present invention is based on these findings.

In the following, preferred embodiments of the present invention will be described with reference to the drawings.

FIG. 1($a$) is a schematic cross-sectional view illustrating an example of a powdery composite material used as an anode material of a rechargeable battery of the present invention. FIG. 1($b$) is a schematic cross-sectional view illustrating another example of a powdery composite material used as an anode material of a rechargeable battery according to the present invention.

In FIG. 1($a$), reference numeral 101 indicates a powdery composite material which comprises a hydrogen storage alloy particle 102 as a core whose surface is coated by a coat layer 103 comprising a hydrous oxide (including a hydroxide). The coat layer 103 has particles 104 of a metal or a metal compound having a catalyst function to make hydrogen in an active state such that said particles 104 are dispersed in the inside of the coat layer 103.

In FIG. 1($b$), reference numeral 101 indicates a powdery composite material which comprises a hydrogen storage alloy particle 102 as a core whose surface is coated by a coat layer 103 comprising a hydrous oxide (including a hydroxide). The coat layer 103 has particles 104 of a metal or a metal compound having a catalyst function to make hydrogen in an active state such that said particles 104 are dispersed in the surface region of the coat layer 103.

The hydrous oxide and the hydroxide which constitute the coat layer 103 are respectively a hydrous oxide and a hydroxide of a metal having an affinity with oxygen which is greater than that of any of the main constituent elements of the hydrogen storage alloy of the hydrogen storage alloy particle 102, and said metal is capable of forming a more stable oxide.

By the hydrous oxide is meant a compound represented by the following general formula (1), and by the hydroxide is meant a compound represented by the following general formula (2).

$$M_xO_y \cdot nH_2O \tag{1}$$

$$M_x(OH)_y \tag{2}$$

(where M is a metal having an affinity with oxygen which is greater than that of any of the main constituent elements of the hydrogen storage alloy of the hydrogen storage alloy particle 102, each of x and y is an integer which is greater than 1, and n is an integer which is greater than zero.)

The coat layer 103 comprising the hydrous oxide (including the hydroxide) is formed by a method wherein a prescribed metal as the constituent element of the hydrous oxide (including the hydroxide) is combined with a particulate of the hydrogen storage alloy, and followed by subjecting to reaction with water or an aqueous alkali solution. Specifically, the metal as the constituent element of the hydrous oxide (including the hydroxide) plays a role of reacting with an oxide coat film formed on the alloy surface to reduce and remove the film during the process of compounding with the hydrogen storage alloy 102, and after being compounded with the hydrogen storage alloy, it plays a role in preventing an oxide coat film from newly forming. Further, after being reacted with said water or said aqueous alkali solution, it forms the coat layer 103 which plays a role of preventing the surface of the hydrogen storage alloy 102 from being oxidized and deteriorated upon subjecting the rechargeable battery to charging and discharging. The reaction with the water or the aqueous alkali solution to form the coat layer may be performed, for instance, in the following method. That is, an electrode formed using a powdery composite material comprising the hydrogen storage alloy particulate whose surface is covered by a metal having an affinity with oxygen which is greater than that of any of the metal elements as the main constituent element of the alloy is subjected to use in the fabrication of a rechargeable battery, where the electrode is contacted and reacted with an aqueous alkali electrolyte solution comprising an alkali electrolyte dissolved in water.

The particles 104 of the metal or the metal compound having a catalyst function to make hydrogen in an active state, which are dispersed in the inside or in the surface region of the coat layer 103, function as a catalyst to facilitate the generation of atomic hydrogen due to electrolysis of water upon subjecting the rechargeable battery to charging and to effectively store the atomic hydrogen in the hydrogen storage alloy particle 102. At this time, the coat layer 103 comprising the hydrous oxide (including the hydroxide) has a large specific surface area and it plays a role as a carrier to effectively disperse the particles 104 of the metal or the metal compound having a catalyst function to make hydrogen in an active state. In addition, the coat layer 103 is high in affinity including wettability with an aqueous series electrolyte solution and it is present in a gel state in many cases, and because of this, the contact area with the electrolyte solution is relatively large. Thus, the charge-and-discharge efficiency and the high rate charge-and-discharge characteristics are not hindered.

When the particles 104 are of the metal having a catalyst function to make hydrogen in an active state, it is possible to make such that the particles serve to improve the inter-particle conductivity of the powdery composite material. For this purpose, the particles 104 are preferred to be dispersed such that they are at least partially exposed at the outermost surface of the powdery composite material 101.

Figure 1B:
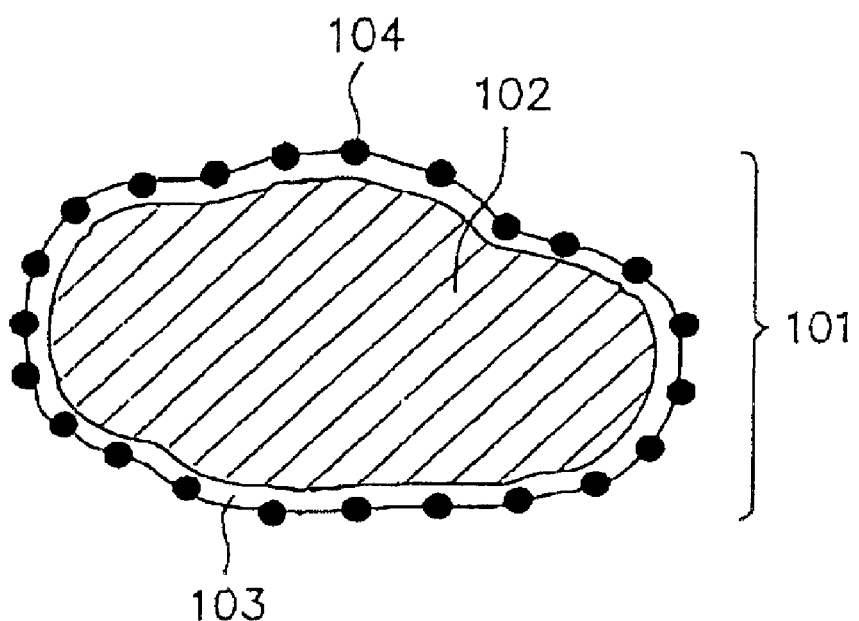
FIG. 1(b) is a schematic cross-sectional view illustrating another example of a composite used as an anode material of a rechargeable battery according to the present invention.

In any of the embodiments shown in FIGS. 1(a) and 1(b), the surface of the hydrogen storage alloy particle 102 is entirely covered by the coat layer 103 comprising the hydrous oxide (including the hydroxide). However, this is not always necessary. It is possible that the surface of the hydrogen storage alloy particle 102 is partially exposed without being covered by the coat layer 103, in any of the embodiments shown in FIGS. 1(a) and 1(b).

Figure 2:
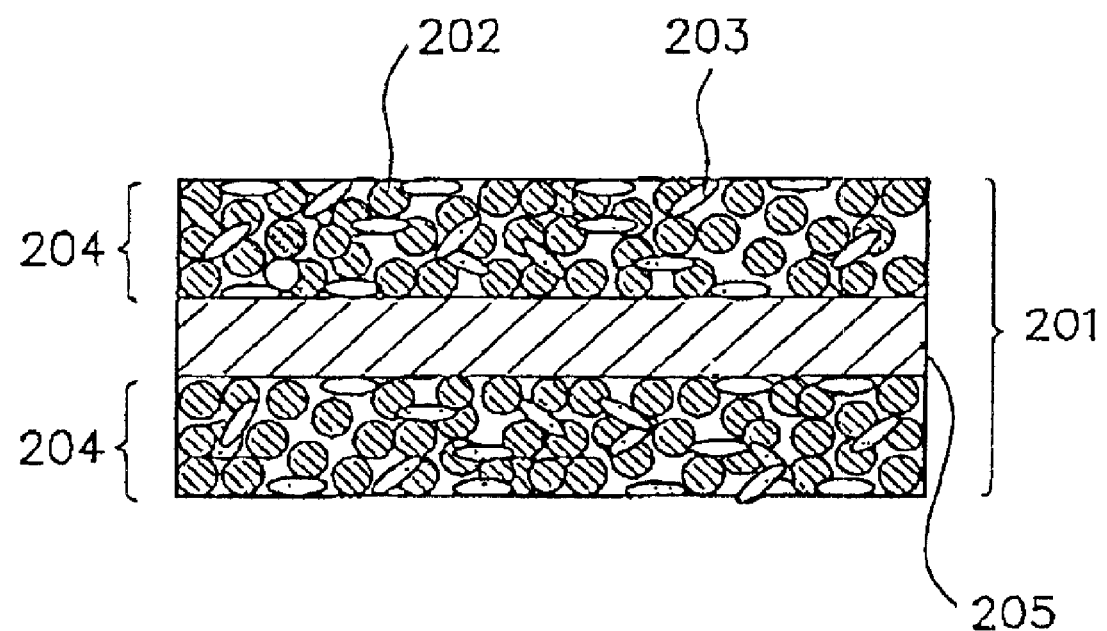
FIG. 2 is a schematic cross-sectional view illustrating the structure of an example of an anode used in a rechargeable battery according to the present invention.

FIG. 2 is a schematic cross-sectional view illustrating the structure of an example of an anode used in a rechargeable battery of the present invention.

In FIG. 2, reference numeral 201 indicates an anode comprising two active material layers 204 respectively formed on one of opposite surfaces of a collector 250. Each of the active material layers 204 is typically formed by fixing a mixture comprising a powdery composite material 202, which comprises composite particles comprising a hydrogen storage alloy particle as a core, and an electrically conductive auxiliary 203 onto one of the opposite surfaces of the collector 205.

The powdery composite material 202 may comprise a plurality of a powdery composite material having such configuration as shown in FIG. 1(a) or FIG. 1(b). The electrically conductive auxiliary 203 is not always necessary to be used. For instance, when the active material layer 204 is formed by sintering the powdery composite material 202 and the collector with each other, the electrically conductive auxiliary 203 is not always necessary to be used.

In this embodiment, the active material layer 204 is formed on each of the opposite surfaces of the collector 205. However, it is possible that the active material layer 204 is formed only on one of the opposite surfaces of the collector 205.

A first feature of the present invention is that a powder of the hydrogen storage alloy as the main constituent of the anode is compounded with the metal having an affinity with oxygen which is greater than that of any of the main constituent elements of the hydrogen storage alloy and which is capable of forming a more stable oxide. This feature makes it possible to reduce and remove the oxide film previously formed on the surface of the hydrogen storage alloy. When a powdery composite material thus obtained is used to form an anode of a rechargeable battery, the anode provides a high active material utilization efficiency from the initial stage of the charge-and-discharge cycle and the period of time required for the initial activation treatment. In addition, the powdery composite material is always free from the formation of a new oxide film even when it is allowed to stand in the atmospheric air over a long period of time, and therefore, the foregoing performance thereof can be maintained over a long period of time, regardless of its state as a starting material or its state when formed into an electrode.

For the foregoing compounded metal, when it is reacted with water or an aqueous alkali solution, there is afforded the coat layer comprising the hydrous oxide (including the hydroxide) which covers the surface of the hydrogen storage alloy as previously described. This provides an improvement in the durability to overcharge, prevents the alloy surface from being oxidized and deteriorated upon charging and discharging, and provides an improvement in the cycle life of the anode.

A second feature of the present invention is that particles of a metal or metal compound having a catalyst function to make hydrogen in an active state are dispersed in the inside or/and the surface region of the coat layer comprising the hydrous oxide (including the hydroxide) as previously described.

The particles function as a catalyst in the electrode reaction. When the particles are of aforesaid metal, there is afforded a powdery composite material comprising a number of composite particles having improved inter-particle conductivity. The use of this powdery composite material as the anode material makes it possible to realize a rechargeable battery having an improved active material utilization efficiency with respect to the anode and which excels in the high-rate discharge characteristics and also in the low-temperature discharge characteristics.

Now, description will be made of the reduction and removal of an oxide coat film formed at the surface of a hydrogen storage alloy.

By the oxide coat film in the present invention is meant a coat film comprising an oxide formed at the surface of a hydrogen storage alloy when an exothermic metal (capable of exothermically reacting with hydrogen to produce a stable hydride) as the main constituent element of the alloy is reacted with oxygen in the air. Whether it is difficult or easy to remove the oxide coat film by way of reduction can be estimated from a value of a standard free-energy change $\Delta G°$ of Gibbs (see, for example, Chemical Handbook Basic Volume, 3rd edition, page II-305, published by Maruzen Kabushiki Kaisha in 1984).

That is, in the case where the $\Delta G°$ value of an oxide of a given metal is converted to a value in terms of per one oxygen atom, it can be said that the smaller the value, the greater the affinity with oxygen of the metal, where a solid oxide coat film is generated. Specifically, for instance, Zr, Ti and V which are exothermic metal elements to constitute a given hydrogen storage alloy have a $\Delta G°$ value in their oxidation which is smaller than that in the water-generating oxidation reaction of hydrogen and also smaller than that in the oxidation reaction of carbon monoxide (a conversion in terms of per one oxygen atom in each case), and therefore, the oxide coat films of these metals are difficult to be removed by means of the ordinary technique by way of hydrogen reduction or carbon reduction.

Thus, in order to remove the oxide coat films of aforesaid metals, it is effective to use a metal having a smaller $\Delta G°$ value converted in terms of per one oxygen atom as a reducing agent.

As a specific example of the method of removing the oxide coat film by way of the reduction reaction, there can be mentioned a method wherein a powder (particulate) of a given hydrogen storage alloy and a powder (particulate) of a metal having a smaller $\Delta G°$ value converted in terms of per one oxygen atom are mixed and mechanical energy is applied thereto by means of a grinding apparatus such as tumbling ball mill, planetary ball mill, or vibration ball mill.

Figure 3:
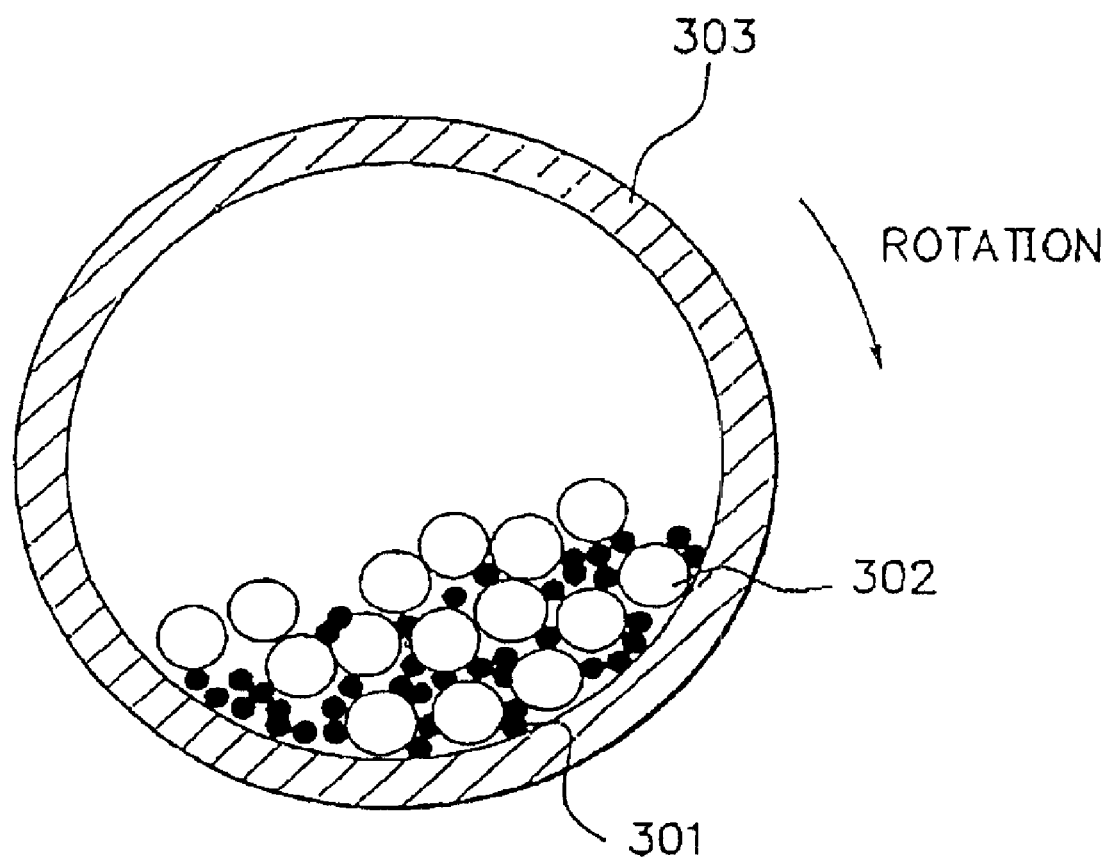
FIG. 3 is a schematic diagram of an example of a grinding apparatus used for the preparation of an anode material in the present invention.

FIG. 3 is a schematic diagram of an example of a tumbling ball mill as a grinding apparatus used in the present invention. In FIG. 3, reference numeral 301 indicates mixed powder, reference numeral 302 a grinding ball, and reference numeral 303 a grinding vessel. In FIG. 3, the mixed powder 301 comprises aforesaid powder of the hydrogen storage alloy and aforesaid powder of the metal having a smaller $\Delta G°$ value converted in terms of per one oxygen atom. By making the grinding vessel perform rotation motion, mechanical energy can be applied to the mixed powder 301 present between the grinding balls 302 and also the mixed powder 301 present between the grinding balls 302 and the inner wall face of the grinding vessel 303.

In accordance with this method, the oxide coat film at the surface of the hydrogen storage alloy of aforesaid hydrogen storage alloy powder is reduced and simultaneously with this, oxide of aforesaid metal and uncreated portion of aforesaid metal are compounded with hydrogen storage alloy powder. At this time, the hydrogen storage alloy powder is atomized to expose non-oxidized face, and because of this, by adding a small amount of the metal powder, it is possible to effectively form active face. In addition, the compounded, unreacted portion of the metal is more likely to receive oxidation in comparison with the metal elements constituting the hydrogen storage alloy and thus, said uncreated portion functions as a protective film to prevent an oxide coat film from newly forming at the surface of the hydrogen storage alloy. Further, after the fabrication of a rechargeable battery, a coat layer comprising a hydrous oxide (including a hydroxide) is formed by way of reaction with an aqueous alkali electrolyte solution and this prevents the surface of the hydrogen storage alloy from being oxidized and deteriorated when the charge-and-discharge cycle is repeated.

As the foregoing metal having a smaller $\Delta G°$ value converted in terms of per one oxygen atom, it is required to use a metal which excels in terms of the reducing force and has proper softness necessary to compound with the hydrogen storage alloy, which is liable to react with water or an aqueous alkali solution to produce a hydrous oxide (including a hydroxide) which is stable against an aqueous alkali electrolyte solution, and which does not hinder the dispersing property of atomic hydrogen and the inter-particle conductivity.

For the coat layer comprising the hydrous oxide (including the hydroxide), it is required to play a role as a carrier to effectively disperse particles of a metal or a metal compound having a catalyst function to make hydrogen in an active state and to have a large specific surface area in order to efficiently exhibit said function.

As preferable specific examples of the metal which satisfies such requirements as above described, there can be mentioned alkaline earth metals such as Mg and Ca, and Al. Of these metals, Mg excels in terms of the reducing force against the foregoing oxide coat film. However, layer formation due to the reaction of Mg with water or an aqueous alkali solution tends to relatively gently proceed to form a dense layer as the foregoing coat layer, and this tends to cause a reduction in the diffusing property of the atomic hydrogen. Similarly, Ca excels in terms of the reducing force against the oxide coat film. However, Ca is difficult to handle because it is liable to readily react with water and even with the moisture in the air. In addition, Ca is difficult to be atomized even when such mechanical energy as above described is applied because it is extremely wealthy in ductility, and therefore, there is an occasion in that it is remained as a thin plate-like shaped particle without being compounded with the hydrogen storage alloy. On the other hand, Al is somewhat inferior to Mg and Ca in terms of the reducing force against the oxide coat film. But Al is stable to water, and therefore, for a product obtained by compounding an aluminum powder with the hydrogen storage alloy powder, it is difficult to receive an influence of moisture even when it is allowed to stand in the atmospheric air over a long period of time, where the aluminum component of the product functions to prevent an oxide coat film from being formed therein. And when the aluminum component is reacted with water or an aqueous alkali solution, there is afforded a coat layer comprising a porous layer having an excellent atomic hydrogen-diffusing property.

Thus, of the above-mentioned metals, Al is particularly preferred. A combination of Al and Mg is more preferred.

It is possible for the coat layer to contain Si. In this case, the coat layer is improved in terms of the durability to the alkali electrolyte solution and the mechanical strength and it has an increased specific surface area. It is also possible for the coat layer to further contain Li. This improves the inter-particle ion conductivity and the inter-particle electron conductivity of the powdery composite material.

Now, when the coat layer comprising the hydrous oxide (including the hydroxide) is excessively formed, the atomic hydrogen is inhibited from being diffused and the inter-particle conductivity of the composite material is decreased, and because of this, the active material utilization efficiency is deteriorated. Thus, the content of the hydrous oxide (including the hydroxide) as the coat layer is preferred to be in a range of from 0.5 to 10 wt. % versus the total weight of the composite material on a dry weight basis. The thickness of the coat layer is preferred to be in a range of from 10 nm to 0.5 $\mu$m.

Upon compounding the hydrogen storage alloy with the metal as the constituent element of the hydrous oxide (including the hydroxide) which will be formed by the following treatment by means of water or an aqueous alkali solution, by properly selected the kind of the grinding apparatus used and the treating condition (the intensity of the mechanical energy to be applied), it is possible to form an amorphous phase-bearing region at the surface of the hydrogen storage alloy.

Incidentally, in an amorphous phase-bearing region, it is generally known that the regularity of a crystal structure is maintained in terms of the short range order but it is not maintained in terms of the long range order (short-distance order).

Thus, by forming such amorphous phase-bearing region at the surface of the hydrogen storage alloy, the diffusion of the atomic hydrogen into the hydrogen storage alloy is facilitated. This results in an improvement in the charging efficiency of a rechargeable battery particularly at the time of rapid charge. In addition, the stress due to expansion and shrinkage of the hydrogen storage alloy upon storing and releasing hydrogen is relaxed to improve the durability to stress breakage.

The amorphization magnitude may be determined, for instance, based on a half-value width of a diffraction peak intensity appeared in wide-angle X-ray diffraction analysis using K $\alpha$-rays of Cu as a radiation source. The half-value width is a value which indicates a width in a half height of the X-ray diffraction peak intensity. And it is meant that the larger the half-value width, the smaller the interplanar uniformity of a crystal, that is, the crystallinity is smaller.

Besides, the amorphization magnitude may also be determined based on appearance of a halo pattern in electron diffraction analysis, disappearance of a lattice pattern in observation by a transmission electron microscope (TEM), or the presence or absence of a calorific peak due to crystallization in analysis by a differential scanning calorimeter (DSC).

Now, in the case where strong mechanical energy is applied to a given sample aiming at forming amorphous phase in a wide range thereof by means of a grinding apparatus, there is an occasion such that the components of the grinding apparatus used therein are partly liberated to contaminate into the sample as impurities during the treatment. For instance, when the treatment is conducted by means of a planetary ball mill using a grinding vessel made of stainless steel or grinding balls made of stainless steel, there is an occasion in that oxide coat film formed on the inner wall face of the grinding vessel or on the surface of each of the grinding balls are liberated by virtue of the mechanical energy, where iron substances based on the stainless steel are contaminated into the sample.

In the present invention, the contamination of such impurity can be desirably prevented from occurring even when the treatment by way of the application of the mechanical energy is conducted using such planetary ball mill, because the metal as the constituent element of the hydrous oxide (including the hydroxide) is effected to the grinding vessel or the grinding balls to prevent aforesaid oxide coat film from being liberated.

When the hydrogen storage alloy is compounded with the metal as the constituent element of the hydrous oxide (including the hydroxide) by way of the application of the mechanical energy in the present invention, it is preferred that a powder of the said metal is added to a powder of the hydrogen storage alloy at a mixing ratio in a range of from 5:95 to 20:80 in terms of weight ratio in order to effectively prevent the oxide coat film from being liberated from the grinding vessel or the grinding balls. When a large amount of the metal powder is used, there is an occasion in that part of the metal powder is remained without being compounded or the thickness of the coat layer formed by the reaction of the metal powder with water or an aqueous alkali solution becomes excessively thick, resulting in a reduction in the utilization efficiency of the anode material. Therefore, it is preferred that such excessive metal powder is removed after the compounding treatment of the metal and the hydrogen storage alloy. The removal of the excessive metal powder may be performed by a treatment using an aqueous acid solution or an aqueous alkali solution when the metal is an alkaline earth metal or aluminum.

In order to form the coat layer comprising the hydrous oxide (including the hydroxide), it is also possible to adopt a method wherein a given hydrogen storage alloy powder or an electrode prepared using said hydrogen storage alloy powder is compounded with a given metal as the constituent element of the hydrous oxide (including the hydroxide) by way of depositing said metal by means of a vacuum deposition technique such as electron beam deposition, resistance heating deposition, sputtering, plasma CVD, or laser-assisted CVD, the resultant is subjected to a heat treatment at a lower temperature than the sintering temperature thereof, followed by subjecting to a treatment with the use of an aqueous alkali solution. In this method, in the heat treatment, the oxide coat film previously formed on the surface of the hydrogen storage alloy is reduced to form an uniform interface with the metal, and in the treatment by means of the aqueous alkali solution, the metal is converted into a hydrous oxide (including a hydroxide) to form the coat layer.

Now, as previously described, in the present invention, it is possible to disperse the particles of the metal or the metal compound having a catalyst function to make hydrogen to be in an active state at the surface of the powdery composite material used as the anode material of the rechargeable battery. The particles dispersed in this way function as a catalyst in the electrode reaction.

Incidentally, there are known transition metals having an electron shell with a vacancy d-orbit and having a property to chemically absorb molecular hydrogen and dissociate said molecular hydrogen into hydrogen atom. Whether or not a given transition metal has a hydrogen-dissociating ability may be estimated by means of the $H_2$ (hydrogen)-$D_2$ (heavy hydrogen) exchange reaction. Particularly, under condition where $H_2$ and $D_2$ co-exist, when a given transition metal has the hydrogen-dissociating ability, H-atom and D-atom which are dissociated and absorbed on the surface of the transition metal are bonded to generate HD. By analyzing this, whether or not a given transition metal has the hydrogen-dissociating ability can be judged.

As the metal having a catalyst function to make hydrogen to be in an active state in the present invention, it is preferred to use a transition metal having such hydrogen-dissociating ability and which has a heat absorption of more than 80 KJ/mol with hydrogen, a work function value of about 4.5 eV, and a shortest interatomic distance in a range of 0.248 to 0.255 nm and in a range of 0.27 to 0.28 nm.

As preferable specific examples of such transition metal, there can be mentioned Ni, Pd, Pt, Co, Fe, Rh, Ru, Ir, Cr, Mo, W, Ta, and Cu. Of these, Ni, Pd, Pt and Cu are particularly preferable because they have a high activity as a hydrogenation catalyst. Ni and Cu are more preferred because they are inexpensive materials. And as the particles of a metal selected from these transition metals are dispersed, there is provided an advantage in that the inter-particle conductivity of the powdery composite material is improved.

The above mentioned transition metals may be used either singly or in combination of two or more of them.

As the metal compound having a catalyst function to make hydrogen to be in an active state, it is preferred to use a metal compound which exhibits the foregoing $H_2$(hydrogen)-$D_2$ (heavy hydrogen) exchange reaction.

As preferable specific examples of such metal compound, there can be mentioned nickel oxide, cobalt oxide, chromium oxide, molybdenum oxide, copper oxide, zinc oxide, molybdenum carbide, and tungsten carbide. These metal compounds may be used either singly or in combination of two or more of them.

To disperse the particles of the metal or the metal compound having a catalyst function to make hydrogen to be in an active state as above described may be performed, for example, by a method wherein (i) a powder of the hydrogen storage alloy, (ii) a powder of the metal as the constituent element of the hydrous oxide (including the hydroxide), and (iii) a powder of the metal or the metal compound having a catalyst function to make hydrogen to be in an active state are mixed to obtain a mixture, and the mixture is subjected to a compounding treatment by applying mechanical energy to the mixture by means of a grinding apparatus such as planetary ball mill, tumbling ball mill, or vibration ball mill.

According to this method, the reduction and removal of the oxide coat film, the formation of the coat layer, the addition of the catalyst for the electrode reaction, and the improvement of the inter-particle conductivity of the powder composite material can be concurrently and readily carried out.

In the case where a nickel powder is used as the powder (iii) of the metal having a catalyst function to make hydrogen to be in an active state, it is preferred to use a nickel fine powder having a large specific surface area such as a carbonyl nickel. When this is used as a catalyst, in general, it is necessary to remove a very thin oxide coat film present on the surface thereof. However, according to the above-described method, said oxide coat film can be concurrently removed by the metal as the constituent element of the hydrous oxide (including the hydroxide) upon the compounding treatment. Therefore, it is not necessary to remove the oxide coat film beforehand as above described.

As such nickel fine powder, Raney nickel can be also desirably used. Besides, it is possible to use a powder of an alloy composed of a metal having a large affinity with oxygen and a metal having a catalyst function to make hydrogen to be in an active state such as a magnesium-nickel alloy and a nickel-aluminum alloy.

In the foregoing method, it is possible that the powder (iii) of the metal or the metal compound having a catalyst function to make hydrogen to be in an active state is directly mixed with the powder (i) of the hydrogen storage alloy and the powder (ii) of the metal as the constituent element of the hydrous oxide (including the hydroxide). However, when the metal powder (iii) is mixed by retaining on a carrier having a large specific surface area comprising a magnesium oxide, an aluminum oxide, a silicon oxide or an activated carbon, it is possible to make the metal powder (iii) to effectively exhibit the function thereof as a catalyst.

As the method for retaining the metal powder (iii) on the carrier, there can be mentioned, for example, a method wherein a solution of a readily decomposable metal salt such as nickel nitrate is impregnated in aforesaid carrier, the resultant is dried and thermally decomposed, followed by subjecting to a reduction treatment, whereby a nickel powder retained on the carrier is obtained; and a method wherein aforesaid carrier is dispersed in a solution containing a metal salt such as nickel nitrate or nickel sulfate, an alkali is added to produce a precipitate on the carrier, the resultant is dried and thermally decomposed, followed by subjecting to a reduction treatment, whereby a nickel powder retained on the carrier is obtained. Besides, there can be also mentioned a method wherein a metal salt capable of being a carrier such as magnesium nitrate or aluminum nitrate and a complexing agent such as citric acid are fused and solidified, the resultant is thermally decomposed, followed by subjecting to a reducing treatment, whereby a nickel powder retained on magnesium oxide or aluminum oxide as the carrier is obtained.

In any of the above methods, the reducing treatment is not always necessary to be conducted. Upon conducting the foregoing compounding treatment, the reducing treatment can be effectively carried out by the metal as the constituent element of the hydrous oxide (including the hydroxide).

In the case of using a powder of a nickel salt of organic acid such as nickel formate, the powder is compounded together with the powder of the metal as the constituent element of the hydrous oxide (including the hydroxide) on the surface of the hydrogen storage alloy powder, followed by subjecting to a thermal decomposition treatment in an inert gas atmosphere. According to this method, it is possible to obtain a nickel powder as the metal powder (iii) from the organic nickel salt.

To disperse the particles of the metal or the metal compound having a catalyst function to make hydrogen to be in an active state may be performed after a powdery composite material comprising the powder of the hydrogen storage alloy compounded with the powder of the metal as the constituent element of the hydrous oxide (including the hydroxide) is formed. This may be performed by an adequate method. As specific examples of such method, there can be mentioned a method wherein a solution containing a salt of a given metal as the metal having a catalyst function to make hydrogen to be in an active state is impregnated in the powdery composite material, the resultant is thermally decomposed, followed by subjecting to a reducing treatment; a method wherein using a plating solution containing a given metal as the metal having a catalyst function to make hydrogen to be in an active state, the metal is directly deposited on the powdery composite material by means of electroplating or electroless plating; and a method wherein a given metal as the metal having a catalyst function to make hydrogen to be in an active state is deposited on the powdery composite material by means of a vacuum deposition technique such as electron beam deposition, resistance heating deposition, sputtering, plasma CVD, or laser-assisted CVD.

The content of the metal or the metal compound having a catalyst function to make hydrogen to be in an active state should be determined so that the function thereof is sufficiently exhibited and the relative amount of the hydrogen storage alloy which occupies in the total amount of the powdery composite material including said metal or said metal compound is not excessively decreased. In general, the content of the metal or the metal compound having a catalyst function to make hydrogen to be in an active state is preferred to be in a range of from 0.5 to 10 wt. % versus the total weight of the powdery composite material.

The coat layer comprising the hydrous oxide (including the hydroxide) [hereinafter simply referred to as "hydrous oxide" for the simplification purpose] may be formed by a method of compounding a prescribed hydrogen storage alloy powder with a given metal capable of forming the hydrous oxide to form a powdery composite material and reacting the metal compounded in the powdery composite material with water or an aqueous alkali solution. The coat layer thus formed on the surface of the hydrogen storage alloy powder functions to improve the durability of the hydrogen storage alloy to overcharge and prevent the surface of the hydrogen storage alloy from being oxidized and deteriorated upon the repetition of the charge-and-discharge cycle. The coat layer also functions as a carrier to efficiently disperse the particles of the metal or the metal compound having a catalyst function to make hydrogen to be in an active state in the inside or/and in the surface region of the coat layer.

As a preferable example of the method for the formation of the coat layer, there can be mentioned a method wherein a powdery composite material formed by compounding a prescribed hydrogen storage alloy powder with a given metal capable of forming the hydrous oxide or an electrode formed using said powdery composite material is immersed in water or an aqueous alkali solution to convert the compounded metal into a hydrous oxide (including a hydroxide) in a layer form as the coat layer. Besides, there can be mentioned a method wherein an assembly comprising an anode (formed using aforesaid powdery composite material which is deposited with particles of a given metal or a given metal compound having a catalyst function to make hydrogen to be in an active state), a separator and a cathode is formed, said assembly is inserted in a battery housing, and an aqueous alkali electrolyte solution is introduced into the battery housing, where the compounded metal present in the anode is reacted with the aqueous alkali electrolyte solution to convert into a hydrous oxide (including a hydroxide) in a layer form as the coat layer.

Of these two methods, the latter method is more preferable because the latter method makes it possible to form the coat later, concurrently with the fabrication of a rechargeable battery.

It is possible that a carbon powder is dispersed in the inside or/and in the surface region of the coat layer.

To disperse the carbon powder in this way may be performed, for example, by a method wherein upon compounding the hydrogen storage alloy powder with the metal capable of forming the hydrous oxide (including the hydroxide) and the metal or the metal compound having a catalyst function to make hydrogen to be in an active state, the carbon powder is concurrently added.

The incorporation of the carbon powder in the coat layer more improves not only the durability of the powdery composite material against overcharge but also the inter-particle conductivity of the powdery composite material.

As above described, according to the present invention, by a simple manner with a small number of steps, it is possible that the oxide coat film formed on the surface of the hydrogen storage alloy is effectively reduced and removed, the coat layer as a protective layer is effectively formed on the surface of the hydrogen storage alloy, and the inter-particle conductivity of the powdery composite material.

And by using the foregoing powdery composite material having the hydrogen storage alloy as the core as a principal component of the anode, it is possible to fabricate a rechargeable battery having a high active material utilization efficiency from the initial stage of the charge-and-discharge cycle and which excels in the high rate discharge characteristics, low-temperature discharge characteristics, rapid charge characteristics, and charge-and-discharge characteristics, at a reasonable production cost.

The hydrogen storage alloy powder used in the present invention may be produced by an appropriate method. As specific examples of such method, there can be mentioned a casting method wherein a prescribed starting metal is fused, the fused material is subjected to a casting treatment and to a heat treatment to obtain an alloy lump, and the alloy lump is pulverized by means of mechanical pulverization or hydro-pulverization to obtain a hydrogen storage alloy powder; a gas-atomizing method wherein high pressure inert gas is sprayed to a molten metal of a prescribed alloy being continuously dropped to obtain a hydrogen storage. alloy powder; a single roll quenching method wherein a molten metal of a prescribed alloy is jetted onto the surface of a rotating roll to obtain a ribbon-like alloy, and the ribbon-like alloy is pulverized to obtain a hydrogen storage alloy powder; and a reduction diffusion method wherein to a mixture comprising a prescribed metal powder and a prescribed metal oxide powder, a metal calcium in an amount which is greater than the theoretical chemical equivalent required to reduce the metal oxide is admixed, and the resultant is subjected to a heat treatment to obtain a hydrogen storage alloy powder. Besides, there can be mentioned a mechanical alloying method, a sputtering method and a method by way of electrowinning in molten salt.

The hydrogen storage alloy powder produced in accordance with such method mentioned in the above is atomized by applying the previously described mechanical energy thereto to afford a hydrogen storage alloy powder comprising fine particles in an undefined form and having a surface with irregularities. The hydrogen storage alloy powder has a given average particle size. The average particle size is different depending on the kind of the grinding apparatus adopted or the treating condition (the intensity of the energy applied). When the average particle size is beyond 30 $\mu$m, it is difficult to ensure a specific surface area in order to efficiently store and release hydrogen. When the average particle size is small to be less than 0.5 $\mu$m, the inter-particle resistance is increased to reduce the active material utilization efficiency.

Thus, it is preferred for the hydrogen storage alloy powder used in the present invention to have an average particle size in a range of from 0.5 to 30 $\mu$m.

Here, description will be made of the average particle size. The average particle size can be determined by measuring a particle size distribution, for instance, in accordance with a laser scattering method. The average particle size may be expressed by an arithmetic means obtained from the total particles, a mode size defined as a particle size in which the frequency distribution value becomes maximum (that is, the vertex of a particle size distribution graph), or a median size defined as a particle size which corresponds a 50% value (a central cumulative value) of a cumulative curve.

The hydrogen storage alloy powder used as an anode material of the rechargeable battery of the present invention affords a distribution curve widened on a large particle size side due to the secondary aggregation in a particle distribution graph in many cases. Therefore, the average particle size in the present invention is expressed by a value of the above-described mode size.

The average particle size can be directly obtained from an image observed by a scanning electron microscope (SEM).

Description will be made of the formation of an anode used in a rechargeable battery of the present invention.

The anode may be formed by fixing an active material layer whose principal component comprising such a powdery composite material having a prescribed hydrogen storage alloy powder as described in the above to a collector. As a typical example of the method for forming the anode, there can be mentioned a method wherein aforesaid powdery composite material is mixed with a solution containing a binder to obtain a paste and the paste is applied onto the collector to form an active material layer on the collector. Upon preparing the paste, if necessary, it is possible to add an electrically conductive auxiliary.

Besides, there can be mentioned a method wherein the powdery composite material is laid on the collector, followed by subjecting to a sintering treatment. According to this method, the contact resistance between the particles of the powdery composite material and that between the powdery composite material and the collector are diminished. Because of this, the resultant anode has excellent conductivity.

The collector (the anode collector) functions to efficiently supply an electric current which is consumed in the electrode reaction upon charging and discharging and to efficiently collect an electric current generated.

Therefore, the anode collector is preferred to comprise a material having excellent conductivity and which is inactive to the battery reaction. As such material, there can be mentioned, for example, punching metal members, expanded metal members, and metal foils, respectively comprising nickel or nickel-plated metallic materials. Besides, the anode collector may comprise a foamed metal porous body obtained by covering a polymer sheet comprising an urethane foam or the like and having a three-dimensional network structure by a metal film of nickel or the like by means of plating or the like and sintering the sheet to decompose and remove the resin components of the sheet, a metal porous body obtained by covering a carbon fiber felt by a metal film of nickel or the like by means of plating, or an unwoven member formed from a metal fiber of nickel or the like.

The foregoing binder can include polyvinyl alcohol; polyvinyl chloride; polyolefin series resins such as polyethylene and polypropylene; fluorine series resins such as polyvinylidene fluoride and tetrafluoroethylene polymer; and celluloses such as methyl cellulose and carboxymethyl cellulose. Of these, methyl cellulose, carboxymethyl cellulose, and polyvinyl alcohol are particularly preferable.

The foregoing electrically conductive auxiliary can include a powdery nickel material, a powdery copper material, amorphous phase-bearing carbon materials such as acetylene black, ketjen black, and the like.

The electrically conductive auxiliary is preferred to be in a spherical form, a flake form, a filament form, a spike form, a needle form, and a form comprising a combination of these forms.

Cathode:

The cathode in the rechargeable battery of the present invention comprises a cathode active material selected from the group consisting of nickel hydroxide, manganese dioxide, silver oxide, and a carbonous material for an air electrode.

As a typical example of a method of preparing the cathode, there can be mentioned a method wherein a powder principally comprising a nickel hydroxide, an electrically conductive material comprising a metal cobalt powder or a powder of a cobalt compound selected from the group consisting of cobalt monoxide and cobalt hydroxide, and if necessary one or more kinds of additives are mixed to obtain a mixture, the mixture is mixed with a solution containing a binder to obtain a paste, and the paste is filled in a collector (a cathode collector) having a porous structure. Upon preparing the paste, if necessary, it is possible to add an electrically conductive auxiliary.

Besides, there can be mentioned a method wherein a perforation thin steel plate applied with a nickel powder is sintered to obtain a sintered member as a collector, the sintered member is immersed in a nickel ion-containing solution to cause a nickel salt in the voids of the sintered member, followed by reacting with an alkali solution to make said nickel salt into a nickel hydroxide.

As well as in the case of the anode, the cathode collector is preferred to comprise a material having excellent conductivity and which is inactive to the battery reaction. As such material, there can be mentioned, for example, a foamed metal porous body obtained by covering a polymer sheet comprising an urethane foam or the like and having a three-dimensional network structure by a metal film of nickel or the like by means of plating or the like and sintering the sheet to decompose and remove the resin components of the sheet, a metal porous body obtained by covering a carbon fiber felt by a metal film of nickel or the like by means of plating, and an unwoven member formed from a metal fiber of nickel or the like. Besides, there can be mentioned punching metal members, expanded metal members, and metal foils, respectively comprising nickel or nickel-plated metallic materials. Further, it is possible to use such sintered member as above described, obtained by sintering a perforation thin steel plate applied with a nickel powder as the cathode collector.

The foregoing binder can include polyvinyl alcohol; polyvinyl chloride; polyolefin series resins such as polyethylene and polypropylene; fluorine series resins such as polyvinylidene fluoride and tetrafluoroethylene polymer; and celluloses such as methyl cellulose and carboxymethyl cellulose. Of these, methyl cellulose, carboxymethyl cellulose, and polyvinyl alcohol are particularly preferable.

The foregoing electrically conductive auxiliary can include a powdery nickel material, a powdery copper material, amorphous phase-bearing carbon materials such as acetylene black, ketjen black, and the like.

The electrically conductive auxiliary is preferred to be in a spherical form, a flake form, a filament form, a spike form, a needle form, and a form comprising a combination of these forms.

Electrolyte:

As the electrolyte used in the rechargeable battery of the present invention, in general, an electrolyte solution obtained by dissolving a prescribed electrolyte in water is used by retaining it in a separator having a porous structure. As preferable specific examples of the electrolyte, there can be mentioned potassium hydroxide, lithium hydroxide, and sodium hydroxide.

Of these, potassium hydroxide has an advantage in that an aqueous solution thereof exhibits high ion conductivity. And lithium hydroxide and sodium hydroxide have an advantage in that they contribute to improving the charging efficiency under high temperature condition. Therefore, an aqueous solution containing potassium hydroxide as a main component and lithium hydroxide or sodium hydroxide as a minor component and is particularly suitable as the electrolyte solution.

In order to prevent leakage of the electrolyte solution, it is desired to use the electrolyte solution by gelling it by a gelling agent into a state with no flowability. As the gelling agent, it is desired to use a polymer having a property of absorbing the solvent of the electrolyte solution to swell. Said polymer can include polyethylene oxide, polyvinyl alcohol, and polyacrylamide.

Separator:

The separator is disposed between the anode and the cathode, and it serves to prevent the anode and the cathode from suffering from internal-shorts. It also serves to retain an electrolyte (or an electrolyte solution) therein depending upon the situation. The separator having the electrolyte retained therein functions as an ion conductor.

The separator is required to have a structure having a number of micropores capable of allowing ion to pass therethrough and it is also required to be insoluble into and stable to the electrolyte solution.

The separator is preferred to be constituted by a non-woven fabric or a membrane having a micropore structure, made of a polyolefin such as polypropylene, polyethylene or the like, a fluororesin, or a polyamide.

In the case of a separator constituted by a polyolefin or a fluororesin, the separator is preferred to be applied with hydrophilic treatment in order to improve its wettability with the electrolyte solution. The hydrophilic treatment can include treatment by irradiation of a plasma such as hydrogen plasma, oxygen plasma, or fluorine plasma, treatment by irradiation of ozone, and corona discharge treatment. Besides, treatment by a chemical reagent such as an acid is also usable.

Separately, the separator may be constituted by a metal oxide film or a resin film combined with a metal oxide, respectively having a number of micropores.

Shape and Structure of Rechargeable Battery:

The rechargeable battery of the present invention may be in the form of a flat round shape, a cylindrical shape, a prismatic shape, or a sheet-like shape. The structure of the rechargeable battery of the present invention may take a single layer structure, a multi-layered structure, a spiral-wound cylindrical structure, or the like. In the case where the rechargeable battery is of a spiral-wound cylindrical structure, the anode, separator, and cathode are arranged in the named order and they are spiral-wound and because of this, it has advantages such that the battery area can be increased as desired and a high electric current can be flowed upon charging and discharging. In the case where the rechargeable battery is of a prismatic structure or a sheet-like structure, there is an advantage in that the space of a device for housing the rechargeable battery can be effectively utilized.

In the following, the shape and structure of a rechargeable battery of the present invention will be detailed with reference to FIGS. 4 to 6.

FIG. 4 is a schematic cross-sectional view illustrating an example of a single-layer flat round type (coin type) rechargeable battery according to the present invention. FIG. 5 is a schematic cross-sectional view illustrating an example of a spiral-wound cylindrical type rechargeable battery according to the present invention. FIG. 6 is a schematic perspective view illustrating an example of a prismatic rechargeable battery according to the present invention.

These rechargeable batteries are basically of the same constitution and comprise an anode, a cathode, a separator with an electrolyte, a battery housing, output terminals, and the like.

Figure 5:
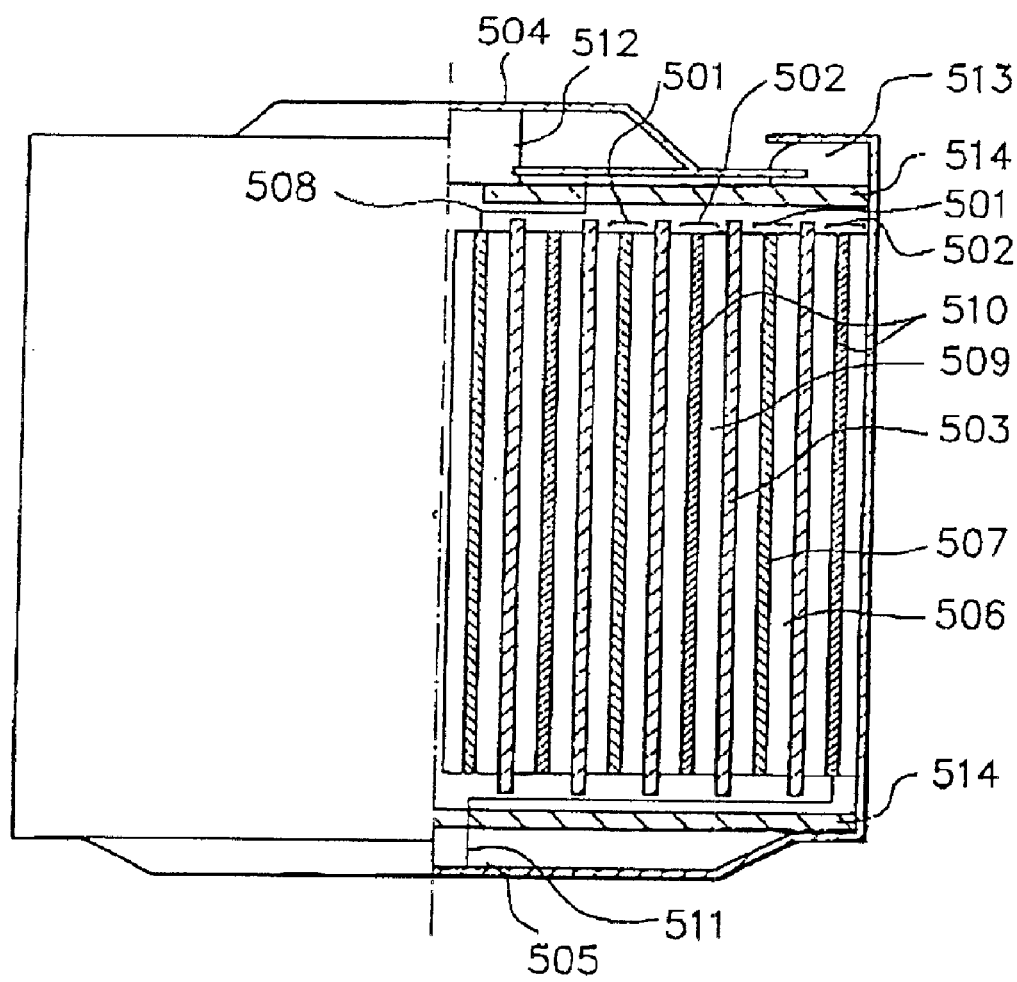
FIG. 5 is a schematic cross-sectional view illustrating an example of a spiral-wound cylindrical rechargeable battery according to the present invention.

In FIGS. 4 to 6, each of reference numerals 401, 501 and 601 indicates a cathode comprising a cathode active material layer; each of reference numerals 402, 502 and 602 an anode comprising an anode active material layer; each of reference numerals 403, 503 and 603 a separator with an electrolyte; each of reference numerals 404, 504 and 604 a cathode terminal (a cathode can or a cathode cap); each of reference numerals 405, 505 and 605 an anode terminal (an anode cap or an anode can); reference numeral 606 a battery housing; reference numeral 506 a cathode active material layer; reference numeral 507 a cathode collector; reference numeral 508 a cathode lead; reference numeral 509 an anode active material layer; reference numeral 510 an anode collector; reference numeral 511 an anode lead; each of reference numerals 512 and 607 a safety vent; each of reference numerals 406 and 513 a gasket; and reference numeral 514 an insulating plate.

[Battery Housing]

In FIGS. 4 and 5, the cathode can or the anode can (404, 505) and the anode cap or the cathode cap (405, 504) together serve as a battery housing. The battery housing is preferred to comprise a steel sheet or a stainless steel sheet. Besides, it may comprise a titanium clad stainless steel sheet, a copper clad stainless steel sheet or a nickel plating steel sheet.

In the case of FIG. 6, the battery housing (606) is independently provided. The battery housing (606) may comprise a stainless steel, a metal such as zinc, a plastic such as polypropylene, or a composite comprising a metal or a glass fiber and a plastic.

[Safety Vent]

In the rechargeable battery of the present invention, a safety vent (512, 607) is provided in order to ensure the safety when the internal pressure in the battery is increased. The safety vent may comprise a rubber, a spring, a metal ball or a rupture foil.

[Insulating Packing]

The gasket (406, 513) may be constituted by a fluororesin, a polyamide resin, a polyolefin resin, a polysulfone resin, or a rubber material. The sealing of the battery may be conducted by way of glass-sealing, sealing using an adhesive, welding or soldering, besides the caulking using the insulating packing as shown in FIG. 4 or FIG. 5.

The insulating plate (514) shown in FIG. 5 may be constituted by a material selected from organic plastic materials and ceramics.

In the following, the present invention will be described in more detail with reference to examples. It should be understood that these examples are only for illustrative purposes and are not the scope of the present invention.

In each of the following examples, a spiral-wound cylindrical type rechargeable battery having such configuration as shown in FIG. 5 was prepared. However, this is not limitative. It is a matter of course to say that the present invention can be desirably adopted also in the preparation of other rechargeable batteries. Similarly in each of the following comparative examples, a spiral-wound cylindrical type rechargeable battery having such configuration as shown in FIG. 5 was prepared.

EXAMPLE 1

In this example, a spiral-wound cylindrical type rechargeable battery having such configuration as shown in FIG. 5 was prepared as will be described below.

1. Formation of Anode 502:

(1) Preparation of Hydrogen Storage Alloy Powder:

A hydrogen storage alloy powder was prepared by a casting process using an arc melting furnace. That is, a powdery zirconium (Zr), a powdery titanium (Ti), a powdery nickel (Ni), a powdery manganese (Mn), a powdery vanadium (V), and a powdery cobalt (Co) respectively in a prescribed amount were mixed to obtain a mixture. The mixture was introduced into the arc melting furnace, where the mixture was heat-fused in an argon atmosphere. The fused material was cooled and subjected to a heat treatment at 1100° C. for 10 hours to obtain an alloy lump. The alloy lump was pulverized by means of hydro-pulverization, followed by subjecting to mechanical pulverization, and sifted an alloy powder with a particle size of less than 200 mesh.

Thus, there was obtained a C15 type Laves phase-bearing hydrogen storage alloy powder having a composition of $Zr_{0.9}Ti_{0.1}Ni_{1.1}Mn_{0.6}V_{0.2}Co_{0.1}$. The hydrogen storage alloy powder was found to have an average particle size of 28 µm, as a result of the measurement by a laser scattering method.

(2) Preparation of Powdery Composite Material:

97 wt. % of the hydrogen storage alloy powder obtained in the above (1), 0.5 wt. % of an aluminum powder having an average particle size of less than 20 µm, 0.5 wt. % of a magnesium powder whose maximum particle size is less than 80 mesh, and 2 wt. % of a carbonyl nickel having an average particle size of less than 1 µm were mixed to obtain a mixture. The mixture was introduced together with grinding balls made of alumina into a grinding vessel made of alumina of a tumbling ball mill, where the inside atmosphere of the grinding vessel was replaced by an argon gas atmosphere and the mixture was subjected to a grinding treatment in the argon gas atmosphere at a revolution speed of 120 rpm for 5 hours to obtain a powdery composite material.

A sample of the powdery composite material was subjected to analysis by means of a scanning auger electron spectral analyzer. As a result, it was found that particles of Al, Mg and Ni were substantially uniformly dispersed on the surface of the powdery composite material. Further, the powdery composite material was found to have an average particle size of 3 µm as a result of the measurement by the laser scattering method.

(3) Formation of Anode:

A prescribed amount of the powdery composite material obtained in the above (2) was mixed with an aqueous solution containing 0.5 wt. % of methyl cellulose as a binder to obtain a paste. The paste was applied on each of the opposite surfaces of a nickel-plated punching metal having a thickness of 80 µm as an anode collector, followed by drying at 80° C. for one hour. The resultant was subjected to press-forming by means of a roll pressing machine to obtain an electrode structural body having a thickness of 0.45 mm. The electrode structural body was cut to have a prescribed size. And a lead comprising a nickel foil tub was connected to the resultant by way of spot-welding. Thus, there was obtained an anode 502.

2. Formation of Cathode:

88 wt. % of a nickel hydroxide powder having an average particle size of 10 µm, 10 wt. % of a cobalt monoxide powder having an average particle size of less than 1 µm, and 2 wt. % of a yttrium oxide powder were mixed to obtain a mixture. The mixture was mixed with an aqueous solution containing 0.5 wt. % of carboxymethylcellulose as a binder to obtain a paste. The paste was impregnated in a 1.5 mm thick foamed nickel porous body of 400 g/m² having an average pore size 100 µm and a porosity of 95% as a cathode collector, followed by drying at 80° C. for one hour. The resultant was subjected to press-forming by means of a roll pressing machine to obtain an electrode structural body having a thickness of 0.75 mm. The electrode structural body was cut to have a prescribed size. And a lead comprising a nickel foil tab was connected to the resultant by way of spot-welding. Thus, there was obtained a cathode 501.

3. Provision of Electrolyte Solution:

There was provided an aqueous solution containing 0.8 mol/l of lithium hydroxide and 6.8 mol/l of potassium hydroxide as an electrolyte solution.

4. Provision of Separator 503:

There was provided a 0.5 mm thick polypropylene unwoven fabric member applied with hydrophilic treatment having a number of micropores as a separator 503.

By introducing the electrolyte solution at a later stage, the electrolyte solution is retained in the micropores of the separator, where the separator having the electrolyte solution therein functions as an ion conductor.

5. Fabrication of a Rechargeable Battery Having Such Configuration as Shown in FIG. 5:

(i). The separator 503 was sandwiched between the cathode 501 and the anode 502 to obtain a stacked member comprising the separator interposed between the cathode and the anode and which has a beginning portion wherein the separator is exposed without being sandwiched between the cathode and the anode and an end portion wherein the separator is exposed without being sandwiched between the cathode and the anode. The stacked member was spirally wound by means of a winding machine using a shaft center for winding a member by detachably fixing the member to the shaft center, winding the member about the shaft center into a roll and detaching the shaft center to obtain a roll product.

More particularly, the beginning portion of the stacked member was fixed to the shaft center of the winding machine and wound about the shaft center to form a roll body having a structure of separator/cathode/separator/anode/separator, and the shaft center was detached from the roll body.

Prior to inserting the roll body into an anode can 505 made of a titanium-clad stainless steel, a pair of insulating plastic sheets 514 were provided, and one of them was installed at the bottom of the anode can 505. Thereafter, the roll body was inserted into the anode can 505. And the other of the insulating plastic sheets 514 was placed above the roll body in the anode can 505.

(ii). The anode lead 511 extending from the anode 502 was spot-welded to a bottom portion of the anode can 505. Thereafter, a constriction was formed at an upper portion of the anode can 505.

A gasket 513 made of polypropylene was installed at the constriction.

A cathode cap 504 having a safety vent 512 was provided. The cathode lead 508 extending from the cathode 501 was welded to the cathode cap 504 by means of an ultrasonic welding machine.

The electrolyte solution provided in the above step 3 was introduced into the anode can 505 containing the roll body.

The cathode cap 504 was capped to the anode can 505, and the cathode cap and the anode can were mechanically caulked by a caulking machine.

Thus, there was obtained a spiral-wound cylindrical type rechargeable battery.

This rechargeable battery was made to be of a cathode capacity-controlled type with a nominal capacity of 1.3 Ah in that the anode capacity is larger by 1.4 times than the cathode capacity.

EXAMPLE 2

The procedures of Example 1 were repeated, except that the step 1-(2) [preparation of powdery composite material]

in the step 1 (formation of anode 502) of Example 1 was conducted as will be described below, to obtain a spiral-wound cylindrical type rechargeable battery.
Preparation of Powdery Composite Material:

97 wt. % of the hydrogen storage alloy powder obtained in the step 1-(1) of Example 1, 1 wt. % of an aluminum powder having an average particle size of less than 20 μm, and 2 wt. % of a carbonyl nickel having an average particle size of less than 1 μm were mixed to obtain a mixture.

The mixture was introduced together with grinding balls made of alumina into a grinding vessel made of alumina of a tumbling ball mill, where the inside atmosphere of the grinding vessel was replaced by an argon gas atmosphere and the mixture was subjected to a grinding treatment in the argon gas atmosphere at a revolution speed of 120 rpm for 5 hours to obtain a powdery composite material.

A sample of the powdery composite material was subjected to analysis by means of a scanning auger electron spectral analyzer. As a result, it was found that particles of Al and Ni were substantially uniformly dispersed on the surface of the powdery composite material. Further, the powdery composite material was found to have an average particle size of 3 μm as a result of the measurement by the laser scattering method.

EXAMPLE 3

The procedures of Example 1 were repeated, except that the step 1-(2) [preparation of powdery composite material] in the step 1 (formation of anode 502) of Example 1 was conducted as will be described below, to obtain a spiral-wound cylindrical type rechargeable battery.
Preparation of Powdery Composite Material:

97 wt. % of the hydrogen storage alloy powder obtained in the step 1-(1) of Example 1, 1 wt. % of a magnesium powder whose maximum particle size is less than 80 mesh, and 2 wt. % of a copper powder having an average particle size of less than 1 μm were mixed to obtain a mixture. The mixture was introduced together with grinding balls made of alumina into a grinding vessel made of alumina of a tumbling ball mill, where the inside atmosphere of the grinding vessel was replaced by an argon gas atmosphere and the mixture was subjected to a grinding treatment in the argon gas atmosphere at a revolution speed of 120 rpm for 5 hours to obtain a powdery composite material.

A sample of the powdery composite material was subjected to analysis by means of a scanning auger electron spectral analyzer. As a result, it was found that particles of Mg and Cu were substantially uniformly dispersed on the surface of the powdery composite material. Further, the powdery composite material was found to have an average particle size of 3 μm as a result of the measurement by the laser scattering method.

EXAMPLE 4

The procedures of Example 1 were repeated, except that the step 1-(2) [preparation of powdery composite material] and the step 1-(3) [formation of anode] in the step 1 (formation of anode 502) of Example 1 were conducted as will be described below, to obtain a spiral-wound cylindrical type rechargeable battery.
Preparation of Powdery Composite Material:

98 wt. % of the hydrogen storage alloy powder obtained in the step 1-(1) of Example 1, 1 wt. % of an aluminum powder having an average particle size of less than 20 μm, and 1 wt. % of a magnesium powder whose maximum particle size is less than 80 mesh were mixed to obtain a mixture. The mixture was introduced together with grinding balls made of alumina into a grinding vessel made of alumina of a tumbling ball mill, where the inside atmosphere of the grinding vessel was replaced by an argon gas atmosphere and the mixture was subjected to a grinding treatment in the argon gas atmosphere at a revolution speed of 120 rpm for 5 hours to obtain a powdery composite material.

A sample of the powdery composite material was subjected to analysis by means of a scanning auger electron spectral analyzer. As a result, it was found that particles of Al and Mg were substantially uniformly dispersed on the surface of the powdery composite material. Further, the powdery composite material was found to have an average particle size of 3 μm as a result of the measurement by the laser scattering method.
Formation of Anode:

98 wt. % of the powdery composite material obtained in the above was mixed with 2 wt. % of a nickel flake-like powder as an electrically conductive auxiliary to obtain a mixture. The mixture was mixed with an aqueous solution containing 0.5 wt. % of methyl cellulose as a binder to obtain a paste. Except for using this paste, the procedures of the step 1-(3) of Example 1 were repeated to obtain an anode 502.

EXAMPLE 5

The procedures of Example 1 were repeated, except that the step 1-(2) [preparation of powdery composite material] and the step 1-(3) [formation of anode] in the step 1 (formation of anode 502) of Example 1 were conducted as will be described below, to obtain a spiral-wound cylindrical type rechargeable battery.
Preparation of Powdery Composite Material:

98 wt. % of the hydrogen storage alloy powder obtained in the step 1-(1) of Example 1 and 2 wt. % of a magnesium powder whose maximum particle size is less than 80 mesh were mixed to obtain a mixture. The mixture was introduced together with grinding balls made of alumina into a grinding vessel made of alumina of a tumbling ball mill, where the inside atmosphere of the grinding vessel was replaced by an argon gas atmosphere and the mixture was subjected to a grinding treatment in the argon gas atmosphere at a revolution speed of 120 rpm for 5 hours to obtain a powdery composite material.

A sample of the powdery composite material was subjected to analysis by means of a scanning auger electron spectral analyzer. As a result, it was found that particles of Mg were substantially uniformly dispersed on the surface of the powdery composite material. Further, the powdery composite material was found to have an average particle size of 3 μm as a result of the measurement by the laser scattering method.
Formation of Anode:

98 wt. % of the powdery composite material obtained in the above was mixed with 2 wt. % of a nickel flake-like powder as an electrically conductive auxiliary to obtain a mixture. The mixture was mixed with an aqueous solution containing 0.5 wt. % of methyl cellulose as a binder to obtain a paste. Except for using this paste, the procedures of the step 1-(3) of Example 1 where repeated to form an anode 502.

COMPARATIVE EXAMPLE 1

The procedures of Example 1 were repeated, except that the step 1-(2) [preparation of powdery composite material] in the step 1 (formation of anode 502) of Example 1 was not conducted but the hydrogen storage alloy powder obtained in the step 1-(1) of Example 1 was used as an anode material as it was, to obtain a spiral-wound cylindrical type rechargeable battery.

In this comparative example, 98 wt. % of the hydrogen storage alloy powder obtained in the step 1-(1) of Example 1 was mixed with 2 wt. % of a nickel flake-like powder as an electrically conductive auxiliary to obtain a mixture. The mixture was mixed with an aqueous solution containing 0.5 wt. % of methyl cellulose as a binder to obtain a paste. Except for using this paste, the procedures of the step 1-(3) of Example 1 were repeated to form an anode 502.

COMPARATIVE EXAMPLE 2

The procedures of Example 1 were repeated, except that the step 1-(2) [preparation of powdery composite material] in the step 1 (formation of anode 502) of Example 1 was not conducted but the hydrogen storage alloy powder obtained in the step 1-(1) of Example 1 was treated as will be described below, to obtain a spiral-wound cylindrical type rechargeable battery.

In this comparative example, the hydrogen storage alloy powder obtained in the step 1-(1) of Example 1 was introduced into an aqueous solution containing 0.8 mol/l of lithium hydroxide and 6.8 mol/l of potassium hydroxide as an electrolyte solution (which is the same as the electrolyte solution used in Example 1) contained in a treating vessel, where the hydrogen storage alloy powder was subjected to a boiling treatment for 2 hours while gently stirring the aqueous solution containing the hydrogen storage alloy powder in the treating vessel. The aqueous solution containing the hydrogen storage alloy powder was taken out from the treating vessel and filtrated to separate the hydrogen storage alloy powder from the aqueous solution. The hydrogen storage alloy powder was sufficiently washed with water and vacuum-dried to obtain a treated hydrogen storage alloy powder.

A sample of the treated hydrogen storage alloy powder was examined by way of analysis by means of a scanning auger electron spectral analyzer. Similarly a sample of the hydrogen storage alloy powder before the treatment was examined. As a result, it was found that the surface region of the hydrogen storage alloy powder before the treatment was oxidized and because of this, the composition ratio of Zr and that of Ti in the element composition of the surface region of the hydrogen storage alloy powder were higher than those in the element composition of the inside region of the hydrogen storage alloy powder. On the other hand, it was found that the composition ratio of Zr and that of Ti in the element composition of the surface region of the treated hydrogen storage alloy powder was approximate to those in the element composition of the inside region of the hydrogen storage alloy powder. Further, the treated hydrogen storage alloy powder was found to have an average particle size of 28 $\mu$m as a result of the measurement by the laser scattering method.

98 wt. % of the treated hydrogen storage alloy powder obtained in the above was mixed with 2 wt. % of a nickel flake-like powder as an electrically conductive auxiliary to obtain a mixture. The mixture was mixed with an aqueous solution containing 0.5 wt. % of methyl cellulose as a binder to obtain a paste. Except for using this paste, the procedures of the step 1-(3) of Example 1 were repeated to form an anode 502.

COMPARATIVE EXAMPLE 3

The procedures of Example 1 were repeated, except that the step 1-(2) [preparation of powdery composite material] in the step 1 (formation of anode 502) of Example 1 was conducted as will be described below, to obtain a spiral-wound cylindrical type rechargeable battery.

Preparation of Powdery Composite Material:

98 wt. % of the hydrogen storage alloy powder obtained in the step 1-(1) of Example 1 and 2 wt. % of a carbonyl nickel having an average particle size of less than 1 $\mu$m were mixed to obtain a mixture. The mixture was introduced together with grinding balls made of alumina into a grinding vessel made of alumina of a tumbling ball mill, where the inside atmosphere of the grinding vessel was replaced by an argon gas atmosphere and the mixture was subjected to a grinding treatment in the argon gas atmosphere at a revolution speed of 120 rpm for 5 hours to obtain a powdery composite material.

A sample of the powdery composite material was subjected to analysis by means of a scanning auger electron spectral analyzer. As a result, it was found that particles of Ni were substantially uniformly dispersed on the surface of the powdery composite material. Further, the powdery composite material was found to have an average particle size of 3 $\mu$m as a result of the measurement by the laser scattering method.

I. Evaluation of Anode Active Material

The powdery composite materials used in Examples 1 to 5 as the anode active material, the hydrogen storage alloy powders used in Comparative Examples 1 and 2 as the anode active material, and the powdery composite material used in Comparative Example 3 as the anode active material were evaluated with respect to discharge capacity in the following manner.

1. A sample of each of these powdery composite materials used in Examples 1 to 5 and Comparative Example 3 and these hydrogen storage alloy powders used in Comparative Examples 1 and 2 is provided. A prescribed amount of the sample is mixed with a copper powder in an amount which is 3 times the amount of the sample in terms of weight ratio to obtain a mixture. The mixture is subjected to press-working by means of a tablet-forming molding machine to obtain a pellet. A current-collecting lead is fixed to the pellet to obtain an anode. Here, there are provided to two cathodes formed in accordance with the method adopted for the formation of the cathode in the step 2 in Example 1 and which have an excessive capacity. The anode is sandwiched between the two cathodes to obtain an electrode body. The electrode body is immersed in an aqueous solution containing 0.8 mol/l of lithium hydroxide and 6.8 mol/l of potassium hydroxide as an electrolyte solution (which is the same as the electrolyte solution used in Example 1) contained in a vessel, to obtain an open type cell of the anode capacity-controlled type. The cell is subjected to a charge-and-discharge cycle test. That is, a charge-and-discharge cycle wherein under environment with 25° C., the cell is charged at 40 mA per 1 g of the hydrogen storage alloy for 12 hours and the cell is discharged at 80 mA per 1 g of the hydrogen storage alloy until the cell voltage becomes 0.9 V is repeated 10 times.

In this cycle test, the discharge capacity after the 1st cycle was measured, and the discharge capacity after the 10th cycle was measured. And a ratio of the discharge capacity after the 1st cycle to that after the 10th cycle was obtained. The ratio obtained was made to be an initial capacity ratio. The discharge capacity measured is per 1 g the hydrogen storage alloy of each sample.

The results obtained are collectively shown in Table 1 together with the average particle sizes measured by the laser scattering method obtained in Examples 1 to 5 and Comparative Examples 1 to 3.

2. The powdery composite materials used in Examples 1 to 5 as the anode active material, the hydrogen storage alloy powders used in Comparative Examples 1 and 2 as the anode active material, and the powdery composite material used in Comparative Example 3 as the anode active material were evaluated with respect to their performance after they had been exposed to the atmospheric air in the following manner.

A sample of each of these powdery composite materials used in Examples 1 to 5 and Comparative Example 3 and these hydrogen storage alloy powders used in Comparative Examples 1 and 2 was provided. Each sample was subjected to an acceleration test wherein the sample was allowed to stand in an atmosphere with 60° C./RH80% for one month. Using each sample thus endured, an open type cell was prepared in the same manner as in the above 1. Each of the cells obtained was subjected to a charging and discharging test in the same manner as in the above 1. And for each cell, the discharge capacity after the 1st cycle was measured, and the discharge capacity after the 10th cycle was measured. And a ratio of the discharge capacity after the 1st cycle to that after the 10th cycle was obtained.

The results obtained are collectively shown in Table 1.

As the results shown in Table 1 illustrate, it is understood that any of the anodes in which the powdery composite materials obtained in Examples 1 to 5 were used exhibits a high discharge capacity from the 1st charge-and-discharge cycle and excels in the initial activity. In addition, it is understood that this performance is still maintained even after the acceleration test. Based on these facts, it is understood that Al and Mg function to reduce and remove an oxide coat film formed on the surface of the hydrogen storage alloy and to afford a protective film which protects an active surface provided as the removal of the oxide coat film and effectively prevents an oxide coat film from being newly formed on the surface.

In addition, as the results of Examples 1 to 3 in Table 1 illustrate, it is understood that by dispersing particles of Ni or Cu on the surface of the powdery composite material, the initial activity of the anode is more improved.

On the other hand, in the case of Comparative Example 1 where the anode comprising the hydrogen storage alloy powder obtained in the step 1-(1) of Example 1 was used, it is understood that not only the initial activity is inferior but also the active material utilization efficiency after the 10th charge-and-discharge cycle is inferior.

For the anodes of Comparative Examples 2 and 3, it is understood that their initial activities are appropriate but they are greatly deteriorated after the acceleration test.

From the results of Comparative Example 2, it is understood that the active surface provided by the alkali treatment is readily oxidized. For the reason why the anode of Comparative Example 3 was relatively high in the initial activity, it is considered such that the exposed non-oxidized surface of the hydrogen storage alloy which was newly-provided by the ball mill grinding treatment was contributed to improving the initial activity. It is considered that the newly-provided surface is also likely to readily suffer from oxidation.

For the reason why the deterioration of the initial activity after the acceleration test of Comparative Example 3 is smaller than that of Comparative Example 2, it is considered such that the content ratio of Ni in the coat layer is relatively high.

II. Evaluation of Battery Characteristics

In each of Examples 1 to 5, there were prepared two spiral-wound rechargeable batteries (a) and (b). Similarly, in each of Comparative Examples 1 to 3, there were prepared two spiral-wound rechargeable batteries (a) and (b). For the rechargeable batteries obtained in Examples 1 to 5 and the rechargeable batteries obtained in Comparative Examples 1 to 3, evaluation was conducted with respect to (1) initial activation, (2) charge-and-discharge cycle characteristic, (3) high rate discharge characteristic, (4) low temperature discharge characteristic; and (5) rapid charge characteristic as will be described below.

The revaluated results are collectively shown in Table 2.

1. Evaluation of the Evaluation Item (1) [Initial Activation]:

This evaluation was performed in the following manner. A charge-and-discharge cycle wherein under environment with 20° C., the rechargeable battery is charged to be 150% of the battery capacity at a constant electric current of a charge rate of 0.1 C for 15 hours, a pause for one hour is taken, the battery is discharged at a constant electric current of a discharge rate of 0.2 C until the battery voltage becomes 0.9 V and a pause for one hour is taken is repeated.

The time when an increase ratio in the discharged capacity along with the repetition of the charge-and-discharge cycle comes to be less than 1% is deemed to be the termination of the activation. The number of the charge-and-discharge cycles at that time is made to be an index of the termination of the initial activation and is shown in Table 2.

This initial activation treatment was conducted for each of the two rechargeable batteries (a) and (b) in each case.

2. Evaluation of the Evaluation Item (2) [Charge-and-Discharge Cycle Characteristic]:

This evaluation was conducted for the rechargeable battery (a) in the following manner.

A charge-and-discharge cycle wherein under environment with 20° C., the rechargeable battery is charged to be 125% of the battery capacity at a constant electric current of a charge rate of 0.5 C for 2.5 hours, a pause for 30 minutes is taken, the battery is discharged at a constant electric current of a discharge rate of 0.5 C until the battery voltage becomes 0.9 V and a pause for 30 minutes is taken is repeated 200 times.

A ratio between the initial discharge capacity and the discharge capacity after the 200th cycle is computed. The ratio obtained is made to a capacity retention ratio as the charge-and-discharge cycle characteristic. The capacity retention ratio is shown in Table 2 in a percentage.

3. Evaluation of the Evaluation Item (3) [High Rate Discharge Characteristic]:

This evaluation was conducted for the rechargeable battery (b) in the following manner.

Under environment with 20° C., the rechargeable battery is charged to be 150% of the battery capacity at a constant electric current of a charge rate of 0.1 C for 15 hours, a pause for one hour is taken, and the battery is discharged at a constant electric current of a discharge rate of 3.0 C until the battery voltage becomes 0.9 V. The discharge capacity at this time is measured.

A ratio of the discharge capacity obtained in this case to the discharge capacity at the time of the discharge rate of 0.2 C in the above evaluation 1 (when the initial activation was terminated) is computed. The ratio obtained is made to be a high rate discharge characteristic of the battery and it is shown in Table 2 in a percentage.

4. Evaluation of the Evaluation Item (4) [Low Temperature Discharge Characteristic]:

This evaluation was conducted for the rechargeable battery (b) in the following manner.

Under environment with 20° C., the rechargeable battery is charged to be 150% of the battery capacity at a constant electric current of a charge rate of 0.1 C for 15 hours, thereafter the environment temperature is decreased to be −10° C., and the battery is discharged at a constant electric current of a discharge rate of 0.2 C until the battery voltage becomes 0.9 V. The discharge capacity at this time is measured.

A ratio of the discharge capacity obtained in this case to the discharge capacity at the time of the discharge rate of 0.2 C in the above evaluation 1 (when the initial activation was terminated) is computed. The ratio obtained is made to be a low temperature discharge characteristic of the battery and it is shown in Table 2 in a percentage.

5. Evaluation of the Evaluation Item (5) [Rapid Charge Characteristic]:

This evaluation was conducted for the rechargeable battery (b) in the following manner.

Under an environment with 20° C., the rechargeable battery is charged to 150% of the battery capacity at a constant electric current at a charge rate of 1.0 C for 1.5 hours, a pause for one hour is taken, and the battery is discharged at a constant electric current at a discharge rate of 0.2 C until the battery voltage becomes 0.9 V. The discharge capacity at this time is measured.

A ratio of the discharge capacity obtained in this case to the discharge capacity when the battery is charged at the charge rate of 0.1 C in the above evaluation 1 (when the initial activation was terminated) is computed. The ratio obtained is made to be a rapid charge characteristic of the battery and it is shown in Table 2 in a percentage.

From the results shown in Table 2, the following facts are understood. That is, any of the rechargeable batteries obtained in Examples 1 to 5 is substantially stabilized with respect to the discharge capacity by repeating the charge-and-discharge cycle only 2 times and excels in the initial activity. And any of these rechargeable batteries still maintains its high capacity even after the charge-and-discharge cycle is repeated 200 times and excels in the charge-and-discharge cycle characteristics. When each of these rechargeable batteries after the charge-and-discharge cycle test was decomposed to take out the powdery composite material of the anode, the powdery composite material was subjected to analysis by means of the scanning auger electron spectral analyzer. As a result, the hydrogen storage alloy powder of the powdery composite material was found to be substantially uniformly covered by the coat layer of Al or Mg in each case. From this, it is understood that the coat layer was formed by the reaction of Al or Mg with the alkali electrolyte solution and the coat later had a protective function to prevent the surface of the hydrogen storage alloy from suffering from oxidation deterioration upon the repetition of the charge-and-discharge cycle. Separately, the coat layer of the powdery composite material used in each of the rechargeable batteries of Examples 1 to 3 was found to have the particles of Ni or Cu substantially uniformly dispersed therein.

On the other hand, the rechargeable battery of Comparative Example 1 is required to repeat the charge-and-discharge cycle 8 times for the completion of the initial activation. Probably because the capacity balance is inferior, the reduction of the capacity due to the repetition of the charge-and-discharge cycle is large.

The rechargeable battery of Comparative Example 2 has a relatively improved initial activity and is relatively satisfactory in the charge-and-discharge characteristics.

The rechargeable battery of Comparative Example 3 excels in the initial activity but the reduction of the capacity due to the repetition of the charge-and-discharge cycle is large. For the reason for this, it is considered such that the powdery composite material is increased with respect to the specific surface area by the grinding treatment by means of the ball mill and it does not have such coat layer as in the examples of the present invention.

Incidentally, in FIG. 7, there are collectively shown an X-ray diffraction chart of a sample of the hydrogen storage alloy powder treated by the grinding treatment in the step 1-(2) [preparation of powdery composition] of Example 1 and an X-ray diffraction chart of a sample of the hydrogen storage alloy powder used in Comparative Example 1.

Now, with respect to the high rate discharge characteristic, low temperature discharge characteristic, and rapid charge characteristic, it is understood that each of the rechargeable batteries of Examples 1 to 4 and Comparative Example 3 are superior to any of the rechargeable batteries of Comparative Examples 1 and 2. For the reason for this, it is considered such that as apparent from the X-ray diffraction charts shown in FIG. 7, the hydrogen storage alloy powder illustrated is somewhat amorphized by the ball mill grinding treatment and as a result, the atomic hydrogen in the inside of the hydrogen storage alloy is facilitated to disperse and the working specific area engaged in the charge-and-discharge reaction is increased by the grinding treatment.

The rechargeable battery of Example 5 in which only Mg was compounded is inferior to the rechargeable batteries of Examples 1 to 4 in terms of the high rate discharge characteristic, low temperature discharge characteristic, and rapid charge characteristic. This indicates that the coat layer of Mg hinders the inter-particle conductivity of the powdery composite material. It is understood that in order to comply with this, to disperse the particles of Ni or Cu or to use Al in combination is effective.

As will be understood from the above description, the present invention enables to realize a rechargeable battery which has a high active material utilization efficiency from the initial stage of the charge-and-discharge cycle, excels in the high rate discharge characteristic, low temperature discharge characteristic, and rapid charge characteristic, and also excels in the charge-and-discharge characteristics, and which can be efficiently produced by a relatively simple production process at a reasonable production cost.

Examples 6 to 13 and Comparative Example 4 which will be described in the following are concerning the quantity of the coat layer formed to cover the surface of the hydrogen storage alloy powder and the influence of the ball mill grinding treatment condition.

EXAMPLE 6

The procedures of Example 1 were repeated, except that the step 1-(2) [preparation of powdery composite material] and the step 1-(3) [formation of anode] in the step 1 (formation of anode 502) of Example 1 were conducted as will be described below, to obtain a spiral-wound cylindrical type rechargeable battery.

Preparation of Powdery Composite Material:

99.8 wt. % of the hydrogen storage alloy powder obtained in the step 1-(1) of Example 1 and 0.2 wt. % of an aluminum powder having an average particle size of less than 20 μm were mixed to obtain a mixture.

The mixture was introduced together with grinding balls made of alumina into a grinding vessel made of alumina of a tumbling ball mill, where the inside atmosphere of the grinding vessel was replaced by an argon gas atmosphere and the mixture was subjected to a grinding treatment in the argon gas atmosphere at a revolution speed of 120 rpm for 5 hours to obtain a powdery composite material.

Formation of Anode:

98 wt. % of the powdery composite material obtained in the above was mixed with 2 wt. % of a nickel flake-like powder as an electrically conductive auxiliary to obtain a mixture.

The mixture was mixed with an aqueous solution containing 0.5 wt. % of methyl cellulose as a binder to obtain a paste. Except for using this paste, the procedures of the step 1-(3) of Example 1 were repeated to obtain an anode 502.

EXAMPLE 7

The procedures of Example 6 were repeated, except that in the preparation of powdery composite material, the amount of the hydrogen storage alloy powder was changed to 99.5 wt. % and the amount of the aluminum powder having an average particle size of less than 20 $\mu$m was changed to 0.5 wt. %, to obtain a spiral-wound cylindrical type rechargeable battery.

EXAMPLE 8

The procedures of Example 6 were repeated, except that in the preparation of powdery composite material, the amount of the hydrogen storage alloy powder was changed to 99 wt. % and the amount of the aluminum powder having an average particle size of less than 20 $\mu$m was changed to 1 wt. %, to obtain a spiral-wound cylindrical type rechargeable battery.

EXAMPLE 9

The procedures of Example 6 were repeated, except that in the preparation of powdery composite material, the amount of the hydrogen storage alloy powder was changed to 98 wt. % and the amount of the aluminum powder having an average particle size of less than 20 $\mu$m was changed to 2 wt. %, to obtain a spiral-wound cylindrical type rechargeable battery.

EXAMPLE 10

The procedures of Example 6 were repeated, except that in the preparation of powdery composite material, the amount of the hydrogen storage alloy powder was changed to 95 wt. % and the amount of the aluminum powder having an average particle size of less than 20 $\mu$m was changed to 5 wt. %, to obtain a spiral-wound cylindrical type rechargeable battery.

EXAMPLE 11

The procedures of Example 6 were repeated, except that in the preparation of powdery composite material, the amount of the hydrogen storage alloy powder was changed to 90 wt. % and the amount of the aluminum powder having an average particle size of less than 20 $\mu$m was changed to 10 wt. %, to obtain a spiral-wound cylindrical type rechargeable battery.

EXAMPLE 12

The procedures of Example 9 were repeated, except that the period of the time of the grinding treatment by the tumbling ball mill was changed to 2 hours, to obtain a spiral-wound cylindrical type rechargeable battery.

EXAMPLE 13

The procedures of Example 9 were repeated, except that the period of the time of the grinding treatment by the tumbling ball mill was changed to 10 hours, to obtain a spiral-wound cylindrical type rechargeable battery.

COMPARATIVE EXAMPLE 4

The procedures of Example 6 were repeated, except that in the preparation of powdery composite material, only the hydrogen storage alloy powder was used without using the aluminum powder, to obtain a spiral-wound cylindrical type rechargeable battery.

Evaluation

1. A sample of each of the powdery composite materials used in Examples 6 to 13 and the hydrogen storage alloy powder used in Comparative Example 4 was provided. Using each sample, an open type cell of the anode capacity-controlled type was prepared in the same manner described in the item 1 of the foregoing Evaluation I. Thus, there were obtained eight kinds of open type cells. In accordance with the evaluation manner described in the item 1 of the foregoing Evaluation I, each of these open type cells was evaluated with respect to the discharge capacity after the 1st charge-and-discharge cycle, the discharge capacity after the 10th charge-and-discharge cycle, and the initial capacity ratio.

The evaluated results are collectively shown in Table 3.

2. For each of the rechargeable batteries obtained in Examples 6 to 13 and Comparative Example 4, evaluation was conducted with respect to (1) initial activation and (2) charge-and-discharge cycle characteristic (capacity retention ratio). The evaluation item (1) was evaluated in the same manner as in the item 1 of the foregoing Evaluation II. The evaluation item (2) was evaluated in the same manner as in the item 2 of the foregoing Evaluation II.

The evaluated results are collectively shown in Table 3.

Based on the results shown in Table 3, the following facts are understood. In the viewpoint of the initial activity, when the mixing ratio of the aluminum powder is relatively small, the effect to improve the initial activity is inferior. For the reason for this, it is considered such that the ability to reduce the oxide coat film formed on the surface of the hydrogen storage alloy is insufficient. The initial activity of the anode formed using the hydrogen storage alloy powder in Comparative Example 4 is somewhat superior to that in Comparative Example 1 although no aluminum powder was admixed. This is considered due to the effect of the newly exposed surface by the ball mill grinding. However, the increase in the specific surface area is considered to accelerate the oxidation deterioration due to the repetition of the charge-and-discharge cycle. In fact, the reduction in the capacity retention ratio after the 200th charge-and-discharge cycle in Comparative Example 4 was significant.

Separately, from the results of Example 12, it is understood that even in the case where the mixing ratio of the aluminum powder is the same (as that in Example 9), when the time of the grinding treatment by the ball mill is short, the sufficient improvement effect cannot be obtained. For the reason for this, it is considered such that the reduction of the oxide coat film formed on the surface of the hydrogen storage alloy and the formation of the protective film by the Al are insufficient.

In the viewpoint of the active material utilization efficiency, it is understood that the discharge capacity after the termination of the initial activation treatment is reduced when the mixing ratio of the aluminum powder is increased. For the reason for this, it is considered such that the coat layer formed by the reaction of the aluminum with the alkali electrolyte solution is excessively formed to cause a reduction in not only the dispersion efficiency of the atomic hydrogen but also in the inter-particle conductivity of the powdery composite material.

Further, it is understood that when the time of the grinding treatment by the ball mill is prolonged, the active material utilization efficiency is decreased but the charge-and-discharge characteristics are improved.

Here, in FIG. 8, an X-ray diffraction chart of a sample of the powdery composite material used in Example 9, an X-ray diffraction chart of a sample of the powdery composite material used in Example 12, and an X-ray diffraction chart of a sample of the powdery composite material used in Example 13 are collectively shown. From the X-ray diffraction charts shown in FIG. 8, it is understood that the half value width is enlarged to broaden as the time of the grinding treatment is increased. That is, the decrease of the active material utilization efficiency is considered due to a cause in that the aluminum is partly alloyed as the time of the grinding treatment is increased to change the element composition of the surface of the hydrogen storage alloy. Separately, for the reason why the charge-and-discharge characteristics are improved as described in the above, it is considered such that the amorphization proceeds as the time of the grinding treatment is increased and because of this, the durability against the stress breakage which will occur upon the storing and releasing of the hydrogen is improved.

From the above observed results, the mixing ratio in terms of the percent by weight of the aluminum powder in the present invention is preferred to be in a range of from 0.2 to 5 wt. % versus the total weight of the powdery composite material.

As above described, the aluminum in the powdery composite material reacts with the alkali electrolyte solution to form an aluminum hydrous oxide (including an aluminum hydroxide) which provides the coat layer. That is, when the aluminum powder in an amount in a range of from 0.2 to 5 wt. % is admixed, the content of the aluminum hydrous oxide (including the aluminum hydroxide) formed is in a range of from about 0.5 to about 10 wt. % versus the total weight of the powdery composite material. When the thickness of the coat layer falling in this range was measured by the scanning auger electron spectral analyzer, it was found to be in a range of from 10 nm to 0.5 $\mu$m.

EXAMPLE 14

The procedures of Example 1 were repeated, except that the step 1-(2) [preparation of powdery composite material] in the step 1 (formation of anode 502) of Example 1 was conducted as will be described below, to obtain a spiral-wound cylindrical type rechargeable battery.
Preparation of Powdery Composite Material:
97 wt. % of the hydrogen storage alloy powder obtained in the step 1-(1) of Example 1 and 3 wt. % of a magnesium-nickel alloy ($Mg_2Ni$) powder whose maximum particle size is less than 80 mesh were mixed to obtain a mixture. The mixture was introduced together with grinding balls made of alumina into a grinding vessel made of alumina of a tumbling ball mill, where the inside atmosphere of the grinding vessel was replaced by an argon gas atmosphere and the mixture was subjected to a grinding treatment in the argon gas atmosphere at a revolution speed of 120 rpm for 5 hours to obtain a powdery composite material.

A sample of the powdery composite material was subjected to analysis by means of the scanning auger electron spectral analyzer. As a result, it was found that the surface of the powdery composite material had particles of Mg and Ni substantially uniformly dispersed therein.

EXAMPLE 15

The procedures of Example 1 were repeated, except that the step 1-(2) [preparation of powdery composite material] in the step 1 (formation of anode 502) of Example 1 was conducted as will be described below, to obtain a spiral-wound cylindrical type rechargeable battery.
Preparation of Powdery Composite Material:
(i). A catalyst powder was prepared in the following manner. A carrier powder comprising an aluminum oxide powder was added into an aqueous solution containing nickel nitrate dissolved therein, followed by being stirred. An aqueous solution of sodium carbonate was dropwise added to the above solution to precipitate particles of nickel carbonate on the carrier powder. The solution containing the carrier powder having the particles of nickel carbonate precipitated thereon was filtrated to obtain a powdery material. The powdery material was sufficiently washed with water and dried. The resultant was subjected to a heat treatment at 330° C. for 30 minute to thermally decompose the particles of nickel carbonate, whereby a catalyst powder comprising a nickel oxide retained on the carrier powder was obtained.

(ii). 97 wt. % of the hydrogen storage alloy powder obtained in the step 1-(1) of Example 1, 1 wt. % of an aluminum powder having an average particle size of less than 20 $\mu$m and 2 wt. % of the catalyst powder obtained in the above (i) were mixed to obtain a mixture. The mixture was introduced together with grinding balls made of alumina into a grinding vessel made of alumina of a tumbling ball mill, where the inside atmosphere of the grinding vessel was replaced by an argon gas atmosphere and the mixture was subjected to a grinding treatment in the argon gas atmosphere at a revolution speed of 120 rpm for 5 hours to obtain a powdery composite material.

A sample of the powdery composite material was subjected to analysis by means of the scanning auger electron spectral analyzer. As a result, it was found that the surface of the powdery composite material had particles of Al and Ni substantially uniformly dispersed therein.

EXAMPLE 16

The procedures of Example 1 were repeated, except that the step 1-(2) [preparation of powdery composite material] in the step 1 (formation of anode 502) of Example 1 was conducted as will be described below, to obtain a spiral-wound cylindrical type rechargeable battery.
Preparation of Powdery Composite Material:
(i). A catalyst powder was prepared in the following manner. A nickel nitrate powder, a magnesium nitrate powder and a citric acid powder were mixed at a mixing ratio of 1:1:2 in terms of molar ratio to obtain a mixture. The mixture was fused at 80° C., followed by subjecting to drying under reduced pressure. The resultant was decomposed by subjecting it to a heat treatment at 200° C. then to a heat treatment in an air atmosphere at 550° C. for 5 hours, whereby a catalyst powder comprising a powdery magnesium oxide as a carrier and a powdery nickel oxide was formed.

(ii). 97 wt. % of the hydrogen storage alloy powder obtained in the step 1-(1) of Example 1, 1 wt. % of a magnesium powder whose maximum particle size is less than 80 mesh and 2 wt. % of the catalyst powder obtained in the above (i) were mixed to obtain a mixture.

The mixture was introduced together with grinding balls made of alumina into a grinding vessel made of alumina of a tumbling ball mill, where the inside atmosphere of the grinding vessel was replaced by an argon gas atmosphere and the mixture was subjected to a grinding treatment in the argon gas atmosphere at a revolution speed of 120 rpm for 5 hours to obtain a powdery composite material.

A sample of the powdery composite material was subjected to analysis by means of the scanning auger electron spectral analyzer. As a result, it was found that the surface of the powdery composite material had particles of Mg and Ni substantially uniformly dispersed therein.

EXAMPLE 17

The procedures of Example 1 were repeated, except that the step 1-(2) [preparation of powdery composite material] and the step 1-(3) [formation of anode] in the step 1 (formation of anode 502) of Example 1 were conducted as will be described below, to obtain a spiral-wound cylindrical type rechargeable battery.
Preparation of Powdery Composite Material:

95 wt. % of the hydrogen storage alloy powder obtained in the step 1-(1) of Example 1, 1 wt. % of an aluminum powder having an average particle size of less than 20 $\mu$m, and 4 wt. % of a nickel formate powder were mixed to obtain a mixture.

The mixture was introduced together with grinding balls made of alumina into a grinding vessel made of alumina of a tumbling ball mill, where the inside atmosphere of the grinding vessel was replaced by an argon gas atmosphere and the mixture was subjected to a grinding treatment in the argon gas atmosphere at a revolution speed of 120 rpm for 5 hours to obtain a powdery composite material.
Formation of Anode:

A prescribed amount of the powdery composite material obtained in the above was subjected together with a nickel-plated punching metal as an anode collector to press-forming by means of a roll pressing machine to obtain an electrode structural body having a thickness of 0.45 mm.

The electrode structural body was subjected to a heat treatment in an argon gas stream at 300° C. for one hour to decompose the nickel formate. The electrode structural body thus treated was sintered by subjecting it to a heat treatment at 900° C. for one hour.

The surface of the sintered electrode structural body was found to have particles of Al and Ni substantially uniformly dispersed therein as a result of the analysis by means of the scanning auger electron spectral analyzer.

The electrode structural body was cut to obtain an electrode body having a prescribed size which will be used in the following and a sample electrode body having a prescribed size which will be used later in the evaluation.

A lead comprising a nickel foil tab was connected to the electrode body obtained in the above by way of spot-welding. Thus, there was obtained an anode 502.

EXAMPLE 18

The procedures of Example 1 were repeated, except that the step 1-(2) [preparation of powdery composite material] in the step 1 (formation of anode 502) of Example 1 was conducted as will be described below, to obtain a spiral-wound cylindrical type rechargeable battery.
Preparation of Powdery Composite Material:

97 wt. % of the hydrogen storage alloy powder obtained in the step 1-(1) of Example 1, 0.5 wt. % of an aluminum powder having an average particle size of less than 20 $\mu$m, 0.5 wt. % of a silicon powder having an average particle size of less than 20 $\mu$m, and 2 wt. % of a carbonyl nickel having an average particle size of less than 1 $\mu$m were mixed to obtain a mixture.

The mixture was introduced together with grinding balls made of alumina into a grinding vessel made of alumina of a tumbling ball mill, where the inside atmosphere of the grinding vessel was replaced by an argon gas atmosphere and the mixture was subjected to a grinding treatment in the argon gas atmosphere at a revolution speed of 120 rpm for 5 hours to obtain a powdery composite material.

A sample of the powdery composite material was subjected to analysis by means of the scanning auger electron spectral analyzer. As a result, it was found that the surface of the powdery composite material had particles of Al, Si and Ni substantially uniformly dispersed therein.

EXAMPLE 19

The procedures of Example 1 were repeated, except that without conducting the step 1-(2) [preparation of powdery composite material] of Example 1, the step 1-(3) [formation of anode] of Example 1 was conducted as will be described below, to obtain a spiral-wound cylindrical type rechargeable battery.
Formation of Anode:

A prescribed amount of the hydrogen storage alloy powder obtained in the step 1-(1) of Example 1 was subjected together with a nickel-plated punching metal as an anode collector to press-forming by means of a roll pressing machine to obtain an electrode structural body having a thickness of 0.45 mm. The electrode structural body was sintered by subjecting it to a heat treatment at 900° C. for one hour. Then using an electron beam deposition apparatus, an aluminum was deposited on the surface of the sintered electrode structural body, followed by subjecting to a heat treatment at 150° C. for one hour.

The electrode structural body thus treated was introduced into an aqueous solution containing 0.8 mol/l of lithium hydroxide and 6.8 mol/l of potassium hydroxide as an electrolyte solution contained in a treating vessel, where the electrode structural body was treated for 30 minutes by heating the solution to a temperature of 80° C. to form an aluminum hydrous oxide (including an aluminum hydroxide) which provides the coat layer. Thereafter, the electrode structural body was taken out from the treating vessel, washed with water and dried. Then an aqueous solution containing nickel nitrate dissolved therein was impregnated in the electrode structural body, followed by subjecting to drying to deposit particles of the nickel nitrate on the surface of the electrode structural body. The electrode structural body was subjected to a heat treatment at 150° C. for one hour to thermally decompose the particles of the nickel nitrate, followed by subjecting to a reduction treatment in a hydrogen stream at 300° C. for one hour.

The surface of the electrode structural body after the reduction treatment was found to particles of Al and Ni substantially uniformly dispersed therein as a result of the analysis by means of the scanning auger electron spectral analyzer.

The electrode structural body was cut to obtain an electrode body having a prescribed size which will be used in the following and a sample electrode body having a prescribed size which will be used later in the evaluation.

A lead comprising a nickel foil tab was connected to the electrode body obtained in the above by way of spot-welding. Thus, there was obtained an anode 502.

COMPARATIVE EXAMPLE 5

The procedures of Example 1 were repeated, except that without conducting the step 1-(2) [preparation of powdery composite material] of Example 1, the step 1-(3) [formation of anode] of Example 1 was conducted as will be described below, to obtain a spiral-wound cylindrical type rechargeable battery.

Formation of Anode:

A prescribed amount of the hydrogen storage alloy powder obtained in the step 1-(1) of Example 1 was subjected together with a nickel-plated punching metal as an anode collector to press-forming by means of a roll pressing machine to obtain an electrode structural body having a thickness of 0.45 mm. The electrode structural body was sintered by subjecting it to a heat treatment at 900° C. for one hour.

An aluminum oxide layer was formed on the surface of the sintered electrode structural body using a sputtering apparatus, followed by subjecting to a heat treatment at 150° C. for one hour. Then an aqueous solution containing nickel nitrate dissolved therein was impregnated in the electrode structural body, followed by subjecting to drying to deposit particles of the nickel nitrate on the surface of the electrode structural body. The electrode structural body was subjected to a heat treatment at 150° C. for one hour to thermally decompose the particles of the nickel nitrate, followed by subjecting to a reduction treatment in a hydrogen stream at 300° C. for one hour.

The electrode structural body was cut to obtain an electrode body having a prescribed size which will be used in the following and a sample electrode body having a prescribed size which will be used later in the evaluation.

A lead comprising a nickel foil tab was connected to the electrode body obtained in the above by way of spot-welding. Thus, there was obtained an anode 502.

Evaluation

1. A sample of each of the powdery composite materials used in Examples 14 to 16 and 18 was provided. Using each sample, an open type cell of the anode capacity-controlled type was prepared in the same manner described in the item 1 of the foregoing Evaluation I. Thus, there were obtained four kinds of open type cells.

For Examples 17 and 19 and Comparative Example 5, using each of the sample electrode bodies provided in these examples, an open type cell of the anode capacity-controlled type was prepared in the same manner described in the item 1 of the foregoing Evaluation I.

Thus, there were obtained three kinds of open type cells.

In accordance with the evaluation manner described in the item 1 of the foregoing Evaluation I, each of these open type cells was evaluated with respect to the discharge capacity after the 1st charge-and-discharge cycle, the discharge capacity after the 10th charge-and-discharge cycle, and the initial capacity ratio.

The evaluated results are collectively shown in Table 4.

2. For each of the rechargeable batteries obtained in Examples 14 to 19 and Comparative Example 5, evaluation was conducted with respect to (1) initial activation and (2) charge-and-discharge cycle characteristic (capacity retention ratio). The evaluation item (1) was evaluated in the same manner as in the item 1 of the foregoing Evaluation II. The evaluation item (2) was evaluated in the same manner as in the item 2 of the foregoing Evaluation II. Incidentally, the discharge capacity value of each of Examples 17 and 19 and Comparative Example 5 was computed as a discharge capacity per a value of the weight of hydrogen storage alloy obtained from the weight of the anode by way of calculation.

The evaluated results are collectively shown in Table 4.

Based on the results shown in Table 4, it is understood that any of the rechargeable batteries in which the powdery composite materials of the examples were used as the anode materials also excels in the initial activity and the charge-and-discharge cycle characteristics. Particularly, as apparent from the results of Example 14, it is understood that even when the powder of an alloy comprising a metal having a large affinity with oxygen and a metal having a catalyst function to make hydrogen to be in active state such as a magnesium-nickel alloy is used, the expected effects are obtained. For the catalyst powders used in Examples 15 and 16, no reduction treatment was performed. But no drawback occurred. This is considered due to the reasons in that the nickel oxide itself has an ability to dissociate hydrogen and it is reduced into Ni by Al or Mg in the ball mill grinding treatment.

It is understood that the rechargeable battery of Example 17 is somewhat inferior in terms of the active material utilization efficiency. This is considered due to a cause in that the hydrogen storage alloy is partly alloyed with Al in the sintering process to entail a change in the element composition of the surface of the alloy. It is understood that the rechargeable battery of Example 18 particularly excels in the capacity retention ratio after the 200th cycle. This is considered due to a cause in that because Si is compounded, the coat layer provided has an improved durability to the alkali electrolyte solution. Further, as apparent from the results of Example 19, even when the coat layer is formed by a deposition method, it exhibits desirable effects.

On the other hand, in the case of Comparative Example 5 in which the aluminum oxide layer was formed, although the rechargeable battery excels in terms of the charge-and-discharge cycle characteristics, it is not satisfactory in terms of the initial activity and the active material utilization efficiency.

In order to clarify the difference between the hydrous oxide (including the hydroxide) and the oxide as the coat layer, there were provided (a) a sample of the anode of Example 19 prior to dispersing the Ni particles and (b) a sample of the anode of Comparative Example 5 prior to dispersing the Ni particles. And for each of the two samples (a) and (b), X-ray diffraction analysis, infrared spectroscopy analysis, thermogravimetry analysis were performed. In the X-ray diffraction analysis, the coat layer comprising the hydrous oxide (including the hydroxide) of the sample (a) afforded a broad diffraction peak. From this, the coat layer was found to have amorphous phase. On the other hand, the coat layer comprising the oxide of the sample (b) afforded a sharp peak which indicates a highly crystalline material. And in the infrared spectroscopy analysis, for the anode surface of the sample (a), there was observed a large spectrum indicating the presence of —OH group or $H_2O$. On the other hand, for the anode surface of the sample (b), such spectrum was not observed. In addition, in the thermogravimetry analysis, a reduction in the weight of the anode of the sample (a) in a temperature range until 200° C. was about 10 times that of the anode of the sample (b).

From these results, it is understood that the coat layer comprising the hydrous oxide (including the hydroxide) is larger than the coat layer comprising the oxide in terms of the specific surface area and is liable to absorb moisture. This indicates that the coat layer comprising the hydrous oxide (including the hydroxide) has an excellent ability to diffuse atomic hydrogen and an excellent affinity to the electrolyte solution. It is considered that this situation provides aforesaid difference with respect to the initial activity and the active material utilization efficiency.

EXAMPLE 20

The procedures of Example 1 were repeated, except that the step 1-(2) [preparation of powdery composite material] and the step 1-(3) [formation of anode] in the step 1 (formation of anode 502) of Example 1 were conducted as will be described below, to obtain a spiral-wound cylindrical type rechargeable battery.

Preparation of Powdery Composite Material:

90 wt. % of the hydrogen storage alloy powder obtained in the step 1-(1) of Example 1 and 10 wt. % of a magnesium powder whose maximum particle size is less than 80 mesh were mixed to obtain a mixture. The mixture was introduced together with grinding balls made of stainless steel into a grinding vessel made of stainless steel of a planetary ball mill, where the inside atmosphere of the grinding vessel was replaced by an argon gas atmosphere and the mixture was subjected to a grinding treatment in the argon gas atmosphere at an acceleration speed of 17 G for one hour to obtain an amorphous phase-bearing powdery composite material.

Then, the powdery composite material was treated using an aqueous hydrochloric acid solution of pH 1 to remove excessive magnesium powder. The powdery composite material thus treated was sufficiently washed with water and dried. A sample of the treated powdery composite material was subjected to analysis by means of X-ray photoelectron spectroscopy (XPS). As a result, from the surface of the powdery composite material, only Mg and the constituent elements of the hydrogen storage alloy were detected. And from the results of the element analysis of the aqueous hydrochloric acid solution used for the treatment by means of inductively coupled plasma emission spectroscopy (ICP), the amount of the Mg remaining in the powdery composite material was found to be 2 wt. %.

Formation of Anode:

98 wt. % of the powdery composite material obtained in the above was mixed with 2 wt. % of a nickel flake-like powder as an electrically conductive auxiliary to obtain a mixture. The mixture was mixed with an aqueous solution containing 0.5 wt. % of methyl cellulose as a binder to obtain a paste. Except for using this paste, the procedures of the step 1-(3) of Example 1 were repeated to obtain an anode 502.

COMPARATIVE EXAMPLE 6

The procedures of Example 1 were repeated, except that instead of the step 1-(2) [preparation of powdery composite material] in Example, 1, the hydrogen storage alloy powder obtained in the step 1-(1) was subjected to grinding treatment and using the treated hydrogen storage alloy powder, an anode was formed as will be described below, to obtain a spiral-wound cylindrical type rechargeable battery.

1. Only a prescribed amount of the hydrogen storage alloy powder obtained in the step 1-(1) of Example 1 was introduced together with grinding balls made of stainless steel into a grinding vessel made of stainless steel of a planetary ball mill, where the inside atmosphere of the grinding vessel was replaced by an argon gas atmosphere and the mixture was subjected to a grinding treatment in the argon gas atmosphere at an acceleration speed of 17 G for one hour to obtain an amorphous phase-bearing hydrogen storage alloy powder.

A sample of the hydrogen storage alloy powder was subjected to analysis by means of X-ray photoelectron spectroscopy (XPS). As a result, it was found that Fe was present on the surface of the hydrogen storage alloy powder other than the constituent elements of the hydrogen storage alloy. And a solution obtained by dissolving another sample of hydrogen storage alloy powder in a high concentration hydrochloric acid and diluting the resultant solution with water was subjected to element analysis by means of inductively coupled plasma emission spectroscopy (ICP). As a result, the content of the Fe in the hydrogen storage alloy powder was found to be 16% in terms of the weight ratio.

2. 98 wt. % of the hydrogen storage alloy powder obtained in the above was mixed with 2 wt. % of a nickel flake-like powder as an electrically conductive auxiliary to obtain a mixture. The mixture was mixed with an aqueous solution containing 0.5 wt. % of methyl cellulose as a binder to obtain a paste. Except for using this paste, the procedures of the step 1-(3) of Example 1 were repeated to obtain an anode 502.

Evaluation

1. A sample of each the powdery composite materials used in Example 20 and the hydrogen storage alloy powder used in Comparative Example 6 was provided. Using each sample, an open type cell of the anode capacity-controlled type was prepared in the same manner described in the item 1 of the foregoing Evaluation I. Thus, there were obtained two kinds of open type cells.

In accordance with the evaluation manner described in the item 1 of the foregoing Evaluation I, each of these open type cells was evaluated with respect to the discharge capacity after the 1st charge-and-discharge cycle, the discharge capacity after the 10th charge-and-discharge cycle, and the initial capacity ratio.

The evaluated results are collectively shown in Table 5.

2. For each of the rechargeable batteries obtained in Example 20 and Comparative Example 6, evaluation was conducted with respect to (1) initial activation and (2) charge-and-discharge cycle characteristic (capacity retention ratio). The evaluation item (1) was evaluated in the same manner as in the item 1 of the foregoing Evaluation II. The evaluation item (2) was evaluated in the same manner as in the item 2 of the foregoing Evaluation II.

The evaluated results are collectively shown in Table 5.

As the results of Table 5 illustrate, the anode formed using the hydrogen storage alloy powder of Comparative Example 6 was extremely inferior in terms of the initial activity and no substantial improvement was observed for the active material utilization efficiency even though the charge-and-discharge cycle was repeated many times.

On the other hand, for Example 20, it had the function to restrain the liberation of an iron material from the grinding apparatus and to prevent occurrence of such significant reduction in the capacity as in Comparative Example 6. Besides, the initial activity was excellent.

In FIG. 9, an X-ray diffraction chart of the powdery composite material of Example 20 and an X-ray diffraction chart of the hydrogen storage alloy powder of Comparative Example 6 are collectively shown.

Now, in the foregoing examples of the present invention, Laves phase alloys were used as the hydrogen storage alloy used as the core of the powdery composite material which is the main constituent material of the anode. However, these alloys are only for the illustrative purposes. The advantages of the present invention are desirably provided even when body-centered cubic structure type solid solution alloys containing Ti, V and the like which are likely to form a solid oxide coat film as well as Laves phase alloys or other hydrogen storage alloys are used.

In addition, all the foregoing examples of the present invention are directed to the nickel-metal hydride batteries only. This is not limitative. According to the present invention, it is possible to produce rechargeable batteries comprising a combination of an anode comprising a specific powdery composite material whose principal constituent comprises a hydrogen storage alloy and a cathode comprising manganese dioxide, silver oxide, or a carbonous material for an air electrode.

As above described, according to the present invention, by a simple manner with several steps, it is possible that an oxide coat film formed on the surface of a hydrogen storage alloy powder is efficiently reduced and removed while forming a coat layer as a protective film on the surface of the alloy, adding an electrode reaction catalyst and improving the inter-particle conductivity. More particularly, according to the present invention, by using a specific powdery composite material whose core comprises a given hydrogen storage alloy as the principal constituent of the anode, it is possible to efficiently produce a rechargeable battery having a high active material utilization efficiency from the initial stage of the charge-and-discharge cycle and which excels in the high rate discharge characteristic, low temperature discharge characteristic, rapid charge characteristic, resistance to overcharge, and charge-and-discharge cycle characteristics, at a reasonable production cost.

TABLE 1

| | | electrode before the acceleration test | | | electrode after the acceleration test | | |
|---|---|---|---|---|---|---|---|
| | average particle size ($\mu$m) | discharge capacity after the $1^{st}$ cycle (mAh/g) | discharge capacity after the $10^{th}$ cycle (mAh/g) | initial capacity ratio (%) | discharge capacity after the $1^{st}$ cycle (mAh/hg) | discharge capacity after the $10^{th}$ cycle (mAh/g) | initial capacity ratio (%) |
| example 1 | 3 | 310 | 334 | 93 | 300 | 331 | 91 |
| example 2 | 3 | 302 | 329 | 92 | 299 | 328 | 91 |
| example 3 | 3 | 303 | 328 | 92 | 295 | 326 | 90 |
| example 4 | 3 | 272 | 329 | 83 | 267 | 325 | 82 |
| example 5 | 3 | 261 | 321 | 81 | 250 | 316 | 79 |
| comparative example 1 | 28 | 15 | 281 | 5 | 12 | 223 | 5 |
| comparative example 2 | 28 | 263 | 337 | 78 | 105 | 277 | 38 |
| comparative example 3 | 3 | 270 | 328 | 82 | 198 | 313 | 63 |

TABLE 2

| | battery capacity (Ah) | cycle number required until the termination of the initial activation (times) | capacity retention ratio (%) | high rate discharge characteristic (%) | low temperature discharge characteristic (%) | rapid charge characteristic (%) |
|---|---|---|---|---|---|---|
| example 1 | 1.31 | 2 | 93 | 84 | 92 | 96 |
| example 2 | 1.30 | 2 | 91 | 86 | 92 | 97 |
| example 3 | 1.30 | 2 | 91 | 82 | 89 | 96 |
| example 4 | 1.30 | 2 | 90 | 85 | 91 | 96 |
| example 5 | 1.30 | 2 | 88 | 79 | 86 | 93 |
| comparative example 1 | 1.29 | 8 | 55 | 58 | 66 | 89 |
| comparative example 2 | 1.31 | 3 | 89 | 78 | 87 | 90 |
| comparative example 3 | 1.30 | 2 | 83 | 85 | 91 | 96 |

TABLE 3

| | the mixing ratio of the aluminum powder (wt %) | the time of the grinding treatment by the ball mill (h) | discharge capacity after the 1st cycle (mAh/g) | discharge capacity after the 10th cycle (mAh/g) | initial capacity ratio (%) | cycle number required until the termination of the initial activation (times) | capacity retention ratio (%) |
|---|---|---|---|---|---|---|---|
| comparative example 4 | 0 | 5 | 87 | 317 | 27 | 6 | 61 |
| example 6 | 0.2 | 5 | 171 | 328 | 52 | 3 | 85 |
| example 7 | 0.5 | 5 | 254 | 325 | 78 | 2 | 89 |
| example 8 | 1 | 5 | 273 | 330 | 83 | 2 | 90 |
| example 9 | 2 | 5 | 269 | 329 | 82 | 2 | 90 |
| example 10 | 5 | 5 | 224 | 283 | 79 | 2 | 91 |
| example 11 | 10 | 5 | 178 | 234 | 76 | 2 | 92 |
| example 12 | 2 | 2 | 143 | 321 | 45 | 2 | 83 |
| example 13 | 2 | 10 | 243 | 296 | 82 | 2 | 94 |

TABLE 4

| | discharge capacity after the 1st cycle (mAh/g) | discharge capacity after the 10th cycle (mAh/g) | initial capacity ratio (%) | cycle number required until the termination of the initial activation (times) | capacity retention ratio (%) |
|---|---|---|---|---|---|
| example 14 | 256 | 328 | 78 | 2 | 88 |
| example 15 | 275 | 331 | 83 | 2 | 90 |
| example 16 | 264 | 322 | 82 | 2 | 89 |
| example 17 | 224 | 305 | 73 | 3 | 91 |
| example 18 | 284 | 330 | 86 | 2 | 95 |
| example 19 | 269 | 323 | 83 | 2 | 90 |
| comparative example 5 | 110 | 305 | 36 | 5 | 9 |

TABLE 5

| | discharge capacity after the 1st cycle (mAh/g) | discharge capacity after the 10th cycle (mAh/g) | initial capacity ratio (%) | cycle number required until the termination of the initial activation (times) | capacity retention ratio (%) |
|---|---|---|---|---|---|
| example 20 | 195 | 228 | 86 | 2 | 94 |
| comparative example 6 | 7 | 50 | 14 | — | — |

What is claimed is:

1. A rechargeable battery comprising an anode, a cathode, a separator and an alkali electrolyte solution, characterized in that said anode comprises an active material comprising a plurality of powdery composites having a structure comprising a core whose surface is covered by a coat layer, said core comprising an alloy particle of alloy (a) capable of reversibly storing and releasing hydrogen as a main component, said alloy (a) containing at least one kind of a metal element (a-i) selected from the group consisting of Zr, Ti and V as a main constituent element, and said coat layer comprising a hydrous oxide of a metal element (b) or a hydroxide of said metal element (b), said metal element (b) having an affinity with oxygen which is greater than that of said metal element (a-i), wherein said metal element (b) is Al.

2. A rechargeable battery according to claim 1, wherein said coat layer has particles of a metal element (c) or a metal compound (c'), said particles having a catalyst function causing hydrogen to be in an active state, wherein said particles are dispersed in the inside and/or in the surface region of said coat layer.

3. A rechargeable battery according to claim 1, wherein said coat layer further comprises a hydrous oxide of a metal element (d) or a hydroxide of said metal element (d), said metal element (d) having an affinity for oxygen which is greater than that of said metal element (a-i), wherein said metal element (d) is an alkaline earth metal.

4. A rechargeable battery according to claim 3, wherein said metal element (d) is Mg or Ca.

5. A rechargeable battery according to claim 4, wherein said metal element (d) is Mg.

6. A rechargeable battery according to claim 1, wherein said hydrous oxide or hydroxide is contained in an amount in a range of from 0.2 to 20 wt. % versus the total weight of said powdery composite material.

7. A rechargeable battery according to claim 6, wherein said hydrous oxide or hydroxide is contained in an amount in a range of from 0.5 to 10 wt. % versus the total weight of said powdery composite material.

8. A rechargeable battery according to claim 1, wherein said coat layer has a thickness in a range of from 5 nm to 1.0 μm.

9. A rechargeable battery according to claim 8, wherein said coat layer has a thickness in a range of from 10 nm to 0.5 μm.

10. A rechargeable battery according to claim 1, wherein said hydrous oxide or hydroxide contains an amorphous phase.

11. A rechargeable battery according to claim 2, wherein said metal element (c) is selected from the group consisting of Ni, Pd, Pt, Co, Fe, Rh, Ru, Ir, Cr, Mo, W, Ta, and Cu.

12. A rechargeable battery according to claim 11, wherein said metal element (c) is selected from the group consisting of Ni, Pd, Pt, and Cu.

13. A rechargeable battery according to claim 2, wherein said metal compound (c') is selected from the group consisting of nickel oxide, cobalt oxide, chromium oxide, molybdenum oxide, copper oxide, zinc oxide, molybdenum carbide, and tungsten carbide.

14. A rechargeable battery according to claim 2, wherein said metal element (c) or metal compound (c') is contained in an amount in a range of from 0.5 to 10 wt. % versus the total weight of said powdery composite material.

15. A rechargeable battery according to claim 1, wherein said coat layer further comprises a carbon powder, wherein said carbon powder is dispersed in the inside and/or in the surface region of said coat layer.

16. A rechargeable battery according to claim 1, wherein said alloy (a) further contains at least Ni as another constituent element.

17. A rechargeable battery according to claim 1, wherein said alloy (a) further contains at least one kind of a metal element selected from the group consisting of Co, Fe, Mn, Cr, Mo, W, Nb, Ta, Hf, Cu, and Zn as another constituent element.

18. A rechargeable battery according to claim 16, wherein said alloy (a) further contains at least one kind of a metal element selected from the group consisting of Co, Fe, Mn, Cr, Mo, W, Nb, Ta, Hf, Cu, and Zn as another constituent element.

19. A rechargeable battery according to claim 1, wherein said alloy (a) is a Laves phase-bearing alloy selected from the group consisting of Laves phase-bearing $C14(MgZn_2)$ type alloys, and Laves phase-bearing $C15(MgCu_2)$ type alloys.

20. A rechargeable battery according to claim 1, wherein said alloy (a) is a body centered cubic structure-bearing solid solution alloy.

21. A rechargeable battery according to claim 1, wherein said alloy particle comprises a particle shaped in an indefinite form with an irregular surface and having an average particle size in a range of from 0.5 to 30 $\mu$m.

22. A rechargeable battery according to claim 1, wherein said alloy (a) contains an amorphous phase.

23. A rechargeable battery according to claim 1, wherein said anode comprises:
   an active material layer comprising at least said powdery composite material; and
   a collector selected from the group consisting of a punching metal, an expanded metal and a metal foil, respectively comprising nickel or a nickel-plated metal.

24. A rechargeable battery according to claim 23, wherein said active material layer is formed by bonding said powdery composite material on said collector together with a binder.

25. A rechargeable battery according to claim 23, wherein said active material layer is formed by sintering between particles of said powdery composite material and between said powdery composite material and said collector.

26. A rechargeable battery according to claim 23, wherein said cathode principally comprises a nickel hydroxide powder.

27. A process for producing a rechargeable battery comprising an anode, a cathode, a separator and an alkali electrolyte solution, characterized in that said process includes a step of forming said anode, comprising:
   a first step (1) of providing an alloy powder (a-i) of an alloy (a) capable of reversibly storing and releasing hydrogen and which contains at least one kind of a metal element (a-ii) selected from the group consisting of Zr, Ti and V as a main constituent element;
   a second step (2) of forming, on the surface of said alloy powder (a-i), a coat layer comprising a hydrous oxide of a metal element (b) or a hydroxide of said metal element (b), said metal element (b) having an affinity with oxygen which is greater than that of said metal element (a-ii), to obtain a powdery composite material comprising a plurality of powdery composites having a structure comprising a core comprising an alloy particle of said alloy (a), said core having a surface which is covered by said coat layer; and
   a third step (3) of forming said anode using said powdery composite material,
   wherein said metal element (b) is Al.

28. The process according to claim 27, wherein said second step (2) includes an additional step of dispersing particles of a metal element (c) or a metal compound (c'), said particles having a catalyst function causing hydrogen to be in an active state, and wherein said particles are dispersed in the inside and/or in the surface region of said coat layer.

29. The process according to claim 27, wherein said step (2) comprises a step (A) of coating the surface of said alloy powder (a-i) with said metal element (b) to obtain a powdery composite material, and a step (B) of reacting said powdery composite material comprising said alloy powder (a-i) coated by said metal element (b) with water or an aqueous alkali solution to convert said metal element (b) coated on the surface of said alloy powder (a-i) to form said hydrous oxide or hydroxide as said coat layer.

30. The process according to claim 29, wherein said step (A) comprises a first step of mixing said alloy powder (a-i) and a powder of said metal element (b) to obtain a mixture, and a second step of applying a mechanical energy to said mixture.

31. The process according to claim 30, wherein the application of said mechanical energy to said mixture is performed by means of a grinding apparatus selected from the group consisting of a tumbling ball mill, a planetary ball mill, and a vibration ball mill.

32. The process according to claim 29, wherein said step (B) is performed by a method of:
   preparing an assembly comprising said anode comprising said powdery composite material obtained in said step (A), said separator and said cathode;
   inserting the assembly in a battery housing;
   and introducing an aqueous alkali electrolyte solution comprising an alkali electrolyte dissolved in water into the battery housing, whereby said metal element (b) coated on the surface of said alloy powder (a-i) is reacted with said aqueous alkali electrolyte solution to form said hydrous oxide or as said coat layer.

33. The process according to claim 28, wherein said step of dispersing said particles is performed at the same time of forming said coat layer, after said coat layer is formed, or at the same time of forming said coat layer and after said coat layer is formed.

34. The process according to claim 33, wherein said step of dispersing said particles is performed by mixing a powder of said metal element (c) having a catalyst function causing hydrogen to be in an active state or a powder of said metal compound (c') having a catalyst function to causing hydrogen to be in an active state, together with said alloy powder (a-i) and a powder of said metal element (b) to obtain a mixture and applying mechanical energy to said mixture.

35. The process according to claim 34, wherein the application of said mechanical energy to said mixture is performed by means of a grinding apparatus selected from the group consisting of a tumbling ball mill, a planetary ball mill, and a vibration ball mill.

36. The process according to claim 27 wherein said coat layer further comprises a hydrous oxide of a metal element (d) or a hydroxide of said metal element (d), said metal element (d) having an affinity for oxygen which is greater than that of said metal element (a-ii), wherein said metal element (d) is an alkaline earth metal.

37. The process according to claim 36, wherein said metal element (d) is Mg or Ca.

38. The process according to claim 37, wherein said metal element (d) is Mg.

39. The process according to claim 27, wherein the content of said hydrous oxide or hydroxide is made to fall in a range of from 0.2 to 20 wt. % versus the total weight of said powdery composite material.

40. The process according to claim 39, wherein the content of said hydrous oxide or hydroxide is made to fall in a range of from 0.5 to 10 wt. % versus the total weight of said powdery composite material.

41. The process according to claim 27, wherein the thickness of said coat layer is made to fall in a range of from 5 nm to 1.0 μm.

42. The process according to claim 41, wherein the thickness of said coat layer is made to fall in a range of from 10 nm to 0.5 μm.

43. The process according to claim 28, wherein said metal element (c) is selected from the group consisting of Ni, Pd, Pt, Co, Fe, Rh, Ru, Ir, Cr, Mo, W, Ta, and Cu.

44. The process according to claim 43, wherein said metal element (c) is selected from the group consisting of Ni, Pd, Pt, and Cu.

45. The process according to claim 28, wherein said metal compound (c') is selected from the group consisting of nickel oxide, chromium oxide, cobalt oxide, molybdenum oxide, copper oxide, zinc oxide, molybdenum carbide, and tungsten oxide.

46. The process according to claim 28, wherein the content of said metal element (c) or metal compound (c') is made to fall in a range of from 0.5 to 10 wt. % versus the total weight of said powdery composite material.

47. The process according to claim 27, wherein a carbon powder is further dispersed such that said carbon powder is dispersed in the inside and/or in the surface region of said coat layer.

48. The process according to claim 27, wherein said alloy (a) further contains at least Ni as another constituent element.

49. The process according to claim 27, wherein said alloy (a) further contains at least one kind of a metal element selected from the group consisting of Co, Fe, Mn, Cr, Mo, W, Nb, Ta, Hf, Cu, and Zn as another constituent element.

50. The process according to claim 48, wherein said alloy (a) further contains at least one kind of a metal element selected from the group consisting of Co, Fe, Mn, Cr, Mo, W, Nb, Ta, Hf, Cu, and Zn as another constituent element.

51. The process according to claim 27, wherein said alloy (a) is a Laves phase-bearing alloy selected from the group consisting of Laves phase-bearing C14($MgZn_2$) type alloys, and Laves phase-bearing C15 ($MgCu_2$) type alloys.

52. The process according to claim 27, wherein said alloy (a) is a body-centered structure-bearing solid solution alloy.

53. The process according to claim 27, which further includes a step of forming said anode by bonding an active material layer comprising at least said powdery composite material on a collector selected from the group consisting of a punching metal, an expanded metal and a metal foil, respectively comprising nickel or a nickel-plated metal.

54. The process according to claim 53 wherein said active material layer is bonded to said collector by mixing said powdery composite material with a solution containing a binder to obtain a paste and applying said paste on said collector.

55. The process according to claim 27 which further includes a step of forming said cathode using a nickel hydroxide powder.

56. A rechargeable battery comprising an anode, a cathode, a separator and an alkali electrolyte solution, characterized in that said anode comprises an active material comprising a plurality of powdery composites having a structure comprising a core whose surface is covered by a coat layer, said core comprising an alloy particle of an alloy (a) capable of reversibly storing and releasing hydrogen as a main component, said alloy (a) containing at least one kind of a metal element (a-i) selected from the group consisting of Zr, Ti and V as a main constituent element, and said coat layer comprising a hydrous oxide of a metal element (b) or a hydroxide of said metal element (b), said metal element (b) having an affinity with oxygen which is greater than that of said metal element (a-i), wherein said metal element (b) is Si or Li.

57. A process for producing a rechargeable battery comprising an anode, a cathode, a separator and an alkali electrolyte solution, characterized in that said process includes a step of forming said anode, said step of forming said anode comprising:
a first step (1) of providing an alloy powder (a-i) of an alloy (a) capable of reversibly storing and releasing hydrogen and which contains at least one kind of a metal element (a-ii) selected from the group consisting of Zr, Ti and V as a main constituent element;
a second step (2) of forming, on the surface of said alloy powder (a-i), a coat layer comprising a hydrous oxide of a metal element (b) or a hydroxide of said metal element (b), said metal element (b) having an affinity with oxygen which is greater than that of said metal element (a-ii), to obtain a powdery composite material comprising a plurality of powdery composites having a structure comprising a core comprising an alloy particle of said alloy (a), said core having a surface which is covered by said coat layer; and
a third step (3) of forming said anode using said powdery composite material,
wherein said step (2) comprises a step (A) of coating the surface of said alloy powder (a-i) with said metal element (b) to obtain a powdery composite material, and a step (B) of reacting said powdery composite material comprising said alloy powder (a-i) coated by said metal element (b) with water or an aqueous alkali solution to convert said metal element (b) coated on the surface of said alloy powder (a-i) to form said hydrous oxide or hydroxide as said coat layer, and
wherein said step (A) comprises a first step of depositing, on the surface of said alloy powder (a-i), a particulate of said metal element (b), said particulate being deposited so as to cover the surface of said alloy powder (a-i) to obtain a powdery composite material comprising said alloy powder (a-i) whose surface has said particulate deposited thereon, and a second step of subjecting said powdery composite material comprising said alloy powder (a-i) whose surface has said particulate deposited thereon to a heat treatment at a temperature which is lower than a sintering temperature at which said powdery composite material comprising said alloy powder (a-i) whose surface has said particulate deposited thereon is sintered and/or to an alkali treatment.

58. The process according to claim 57, wherein the deposition of said particulate is performed by means of a vacuum deposition technique selected from the group consisting of electron beam deposition, resistance heating deposition, sputtering, plasma CVD, and laser-assisted CVD.

59. A process for producing a rechargeable battery comprising an anode, a cathode, a separator and an alkali electrolyte solution, characterized in that said process includes a step of forming said anode, comprising:

a first step (1) of providing an alloy powder (a-i) of an alloy (a) capable of reversibly storing and releasing hydrogen and which contains at least one kind of a metal element (a-ii) selected from the group consisting of Zr, Ti and V as a main constituent element;

a second step (2) of forming, on the surface of said alloy powder (a-i), a coat layer comprising a hydrous oxide of a metal element (b) or a hydroxide of said metal element (b), said metal element (b) having an affinity with oxygen which is greater than that of said metal element (a-ii), to obtain a powdery composite material comprising a plurality of composites having a structure comprising a core comprising an alloy particle of said alloy (a), said core having a surface which is covered by said coat layer; and a third step (3) of forming said anode using said powdery composite material, wherein said second step (2) includes an additional step of dispersing particles of a metal element (c) or a metal compound (c'), said particles having a catalyst function causing hydrogen to be in an active state, and said particles being dispersed in the inside and/or in the surface region of said coat layer, wherein said step of dispersing said particles is performed at the same time of forming said coat layer, after said coat layer is formed, or at the same time of forming said coat layer and after said coat layer is formed, and wherein said step of dispersing said particles is performed by depositing a salt of said metal element (c) on the surface of said powdery composite material and reducing said salt.

60. A process for producing a rechargeable battery comprising an anode, a cathode, a separator and an alkali electrolyte solution, characterized in that said process includes a step of forming said anode, comprising:

a first step (1) of providing an alloy powder (a-i) of an alloy (a) capable of reversibly storing and releasing hydrogen and which contains at least one kind of a metal element (a-ii) selected from the group consisting of Zr, Ti and V as a main constituent element;

a second step (2) of forming, on the surface of said alloy powder (a-i), a coat layer comprising a hydrous oxide of a metal element (b) or a hydroxide of said metal element (b), said metal element (b) having an affinity with oxygen which is greater than that of said metal element (a-ii), to obtain a powdery composite material comprising a plurality of composites having a structure comprising a core comprising an alloy particle of said alloy (a), said core having a surface which is covered by said coat layer; and a third step (3) of forming said anode using said powdery composite material, wherein said second step (2) includes an additional step of dispersing particles of a metal element (c) or a metal compound (c'), said particles having a catalyst function causing hydrogen to be in an active state, and said particles being dispersed in the inside and/or in the surface region of said coat layer, wherein said step of dispersing said particles is performed at the same time of forming said coat layer, after said coat layer is formed, or at the same time of forming said coat layer and after said coat layer is formed, and wherein said step of dispersing said particles is performed by means of electroless plating or electroplating.

61. A process for producing a rechargeable battery comprising an anode, a cathode, a separator and an alkali electrolyte solution, characterized in that said process includes a step of forming said anode, comprising:

a first step (1) of providing an alloy powder (a-i) of an alloy (a), said alloy powder (a-i) being capable of reversibly storing and releasing hydrogen and containing at least one kind of a metal element (a-ii) selected from the group consisting of Zr, Ti and V as a main constituent element;

a second step (2) of forming, on a surface of said alloy powder (a-ii), a coat layer comprising a hydrous oxide of a metal element (b) or a hydroxide of said metal element (b), said metal element (b) having an affinity with oxygen which is greater than that of said metal element (a-ii), to obtain a powdery composite material comprising a plurality of composites having a structure comprising a core comprising an alloy particle of said alloy (a), said core having a surface which is covered by said coat layer; and a third step (3) of forming said anode using said powdery composite material, wherein said second step (2) includes an additional step of dispersing particles of a metal element (c) or a metal compound (c'), said particles having a catalyst function causing hydrogen to be in an active state, and said particles being dispersed in the inside and/or in the surface region of said coat layer, wherein said step of dispersing said particles is performed at the same time of forming said coat layer, after said coat layer is formed, or at the same time of forming said coat layer and after said coat layer is formed, and wherein said step of dispersing said particles is performed by means of a vacuum deposition technique.

62. The process according to claim 61, wherein the vacuum deposition technique is selected from the group consisting of electron beam deposition, resistance heating deposition, sputtering, plasma CVD, and laser-assisted CVD.

63. A process for producing a rechargeable battery comprising an anode, a cathode, a separator and an alkali electrolyte solution, characterized in that said process includes a step of forming said anode, said step of forming said anode comprising:

a first step (1) of providing an alloy powder (a-i) of an alloy (a) capable of reversibly storing and releasing hydrogen and which contains at least one kind of a metal element (a-ii) selected from the group consisting of Zr, Ti and V as a main constituent element;

a second step (2) of forming, on the surface of said alloy powder (a-i), a coat layer comprising a hydrous oxide of a metal element (b) or a hydroxide of said metal element (b), said metal element (b) having an affinity with oxygen which is greater than that of said metal element (a-ii), to obtain a powdery composite material comprising a plurality of powdery composites having a structure comprising a core comprising an alloy particle of said alloy (a), said core having a surface which is covered by said coat layer; and a third step (3) of forming said anode using said powdery composite material, wherein said metal element (b) is Si or Li.

64. A process for producing a rechargeable battery comprising an anode, a cathode, a separator and an alkali electrolyte solution, characterized in that said process includes a step of forming said anode comprising:

a first step (1) of providing an alloy powder (a-i) of an alloy (a) capable of reversibly storing and releasing hydrogen and which contains at least one kind of a metal element (a-ii) selected from the group consisting of Zr, Ti and V as a main constituent element;

a second step (2) of forming, on the surface of said alloy powder (a-i), a coat layer comprising a hydrous oxide of a metal element (b) or a hydroxide of said metal element (b), said metal element (b) having an affinity with oxygen which is greater than that of said metal element (a-ii), to obtain a powdery composite material comprising a plurality of composites having a structure comprising a core comprising an alloy particle of said alloy (a), said core having a surface which is covered by said coat layer; and a third step (3) of forming said anode using said powdery composite material, wherein the process further includes a step of forming said anode by bonding an active layer comprising at least said powdery composite material on a collector selected from the group consisting of a punching metal, an expanded metal and a metal foil, respectively comprising nickel or a nickel-plated metal, and wherein said active material layer is bonded to said collector by sintering between particles of said powdery composite material and between said powdery composite material and said collector.

* * * * *

UNITED STATES PATENT AND TRADEMARK OFFICE
CERTIFICATE OF CORRECTION

PATENT NO. : 6,902,845 B2
DATED : June 7, 2005
INVENTOR(S) : Atsushi Tani et al.

It is certified that error appears in the above-identified patent and that said Letters Patent is hereby corrected as shown below:

<u>Title page,</u>
Item [57], ABSTRACT,
Line 2, "material said" should read -- material, said --.

<u>Column 17,</u>
Line 16, "selected" should read -- selecting --.

<u>Column 22,</u>
Line 22, "storage." should read -- storage --.

<u>Column 32,</u>
Line 41, "to two" should read -- two --.

<u>Column 39,</u>
Line 24, "in the" should be deleted.

<u>Column 40,</u>
Line 24, "minute" should read -- minutes --.

<u>Column 52,</u>
Line 58, "claim 27" should read -- claim 27, --.

<u>Column 53,</u>
Line 57, "claim 53" should read -- claim 53, --; and
Line 62, "claim 27" should read -- claim 27, --.

Signed and Sealed this

Twenty-eighth Day of March, 2006

JON W. DUDAS
*Director of the United States Patent and Trademark Office*